(12) United States Patent
Langhammer et al.

(10) Patent No.: US 11,216,532 B2
(45) Date of Patent: Jan. 4, 2022

(54) CIRCUITRY FOR HIGH-BANDWIDTH, LOW-LATENCY MACHINE LEARNING

(71) Applicant: Intel Corporation, Santa Clara, CA (US)

(72) Inventors: Martin Langhammer, Alderbury (GB); Andrei-Mihai Hagiescu-Miriste, East York (CA)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 16/369,973

(22) Filed: Mar. 29, 2019

(65) Prior Publication Data

US 2019/0228051 A1    Jul. 25, 2019

Related U.S. Application Data

(60) Provisional application No. 62/736,981, filed on Sep. 26, 2018.

(51) Int. Cl.
*G06F 17/16*    (2006.01)
*G06N 5/00*    (2006.01)

(52) U.S. Cl.
CPC .............. *G06F 17/16* (2013.01); *G06N 5/00* (2013.01)

(58) Field of Classification Search
CPC ...................................................... G06F 17/16
See application file for complete search history.

(56) References Cited

U.S. PATENT DOCUMENTS

| 6,891,538 | B1 * | 5/2005 | Tannenbaum | G06F 17/16 345/426 |
| 8,825,730 | B1 * | 9/2014 | Perry | G06F 17/16 708/520 |
| 10,049,082 | B2 | 8/2018 | Ling et al. | |
| 2019/0325296 | A1 * | 10/2019 | Fowers | G06F 15/8053 |

OTHER PUBLICATIONS

U.S. Appl. No. 15/818,298, filed Nov. 20, 2017, Chen, et al.
U.S. Appl. No. 16/144,904, filed Sep. 27, 2018, Hurd, et al.

* cited by examiner

*Primary Examiner* — Michael D. Yaary
(74) *Attorney, Agent, or Firm* — Fletcher Yoder, P.C.

(57) ABSTRACT

The present disclosure relates generally to techniques for efficiently performing operations associated with artificial intelligence (AI), machine learning (ML), and/or deep learning (DL) applications, such as training and/or interference calculations, using an integrated circuit device. More specifically, the present disclosure relates to an integrated circuit design implemented to perform these operations with low latency and/or a high bandwidth of data. For example, embodiments of a computationally dense digital signal processing (DSP) circuitry, implemented to efficiently perform one or more arithmetic operations (e.g., a dot-product) on an input are disclosed. Moreover, embodiments described herein may relate to layout, design, and data scheduling of a processing element array implemented to compute matrix multiplications (e.g., systolic array multiplication).

20 Claims, 31 Drawing Sheets

FIG. 13

| | A | B | A′ | B′ | R |
|---|---|---|---|---|---|
| 0 | $A_{00}$ | $B_0^0$ | $A_{04}$ | $B_4^0$ | $R_0^0$ |
| 1 | $A_{10}$ | $B_0^1$ | $A_{14}$ | $B_4^1$ | $R_1^0$ |
| 2 | $A_{20}$ | $B_0^2$ | $A_{24}$ | $B_4^2$ | $R_2^0$ |
| 3 | $A_{30}$ | $B_0^3$ | $A_{34}$ | $B_4^3$ | $R_3^0$ |
| 4 | $A_{01}$ | $B_1^0$ | $A_{05}$ | $B_5^0$ | $R_0^1$ |
| 5 | $A_{11}$ | $B_1^1$ | $A_{15}$ | $B_5^1$ | $R_1^1$ |
| 6 | $A_{21}$ | $B_1^2$ | $A_{25}$ | $B_5^2$ | $R_2^1$ |
| 7 | $A_{31}$ | $B_1^3$ | $A_{35}$ | $B_5^3$ | $R_3^1$ |
| 8 | $A_{02}$ | $B_2^0$ | $A_{06}$ | $B_6^0$ | $R_0^2$ |
| 9 | $A_{12}$ | $B_2^1$ | $A_{16}$ | $B_6^1$ | $R_1^2$ |
| 10 | $A_{22}$ | $B_2^2$ | $A_{26}$ | $B_6^2$ | $R_2^2$ |
| 11 | $A_{32}$ | $B_2^3$ | $A_{36}$ | $B_6^3$ | $R_3^2$ |
| 12 | $A_{03}$ | $B_3^0$ | $A_{07}$ | $B_7^0$ | $R_0^3$ |
| 13 | $A_{13}$ | $B_3^1$ | $A_{17}$ | $B_7^1$ | $R_1^3$ |
| 14 | $A_{23}$ | $B_3^2$ | $A_{27}$ | $B_7^2$ | $R_2^3$ |
| 15 | $A_{33}$ | $B_3^3$ | $A_{37}$ | $B_7^3$ | $R_3^3$ |

CIRCUITRY FOR HIGH-BANDWIDTH, LOW-LATENCY MACHINE LEARNING

CROSS REFERENCE TO RELATED APPLICATIONS

This application claims priority from and benefit of U.S. Provisional Application Ser. No. 62/736,981, filed Sep. 26, 2018, entitled "Circuitry for High-Bandwidth, Low-Latency Machine Learning," which is hereby incorporated by reference in its entirety for all purposes.

BACKGROUND

The present disclosure relates generally to integrated circuits, such as field-programmable gate arrays (FPGAs). More particularly, the present disclosure relates to techniques to efficiently implement operations associated with artificial intelligence (AI), machine learning (ML), and/or deep learning (DL) on an integrated circuit (e.g., programmable logic of an FPGA).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Machine learning (ML) is becoming increasingly valuable in a number of technical fields. For example, machine learning may be used in natural language processing, image processing, computer vision, such as object recognition, bioinformatics, and economics, among other fields and applications. Deep learning (DL), which is a subset of machine learning, may use a number of inference computations in a neural network to deliver prediction data for use in suitable fields and applications, such as those listed above. Additionally, artificial intelligence (AI) applications may use a number of training and/or inference computations to deliver prediction data for use in suitable fields and applications, such as those listed above. Because these training and/or inference computations may include a number of dot-products, which may include a set of multiplications followed by addition, multiplier circuits may be used in deep learning applications. Further, the growth of neural networks in deep learning and/or growth of machine learning and/or artificial intelligence applications may result in increased amounts of data and inference computations. Accordingly, to accommodate growth and improvement of machine learning implementations and applications, such as deep learning, the number of multipliers implemented in and/or the amount of data handled by an integrated circuit may increase dramatically. However, multipliers and data handling circuits may consume significant area, power, and routing resources of the integrated circuit and/or may introduce latency to computations.

BRIEF DESCRIPTION OF THE DRAWINGS

Various aspects of this disclosure may be better understood upon reading the following detailed description and upon reference to the drawings in which:

FIG. 13 is a table of the dataflow through the tensor DSP circuitry, in accordance with an embodiment;

FIG. 15 is a table of the dataflow through the high-density tensor DSP circuitry, in accordance with an embodiment;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

As discussed in further detail below, embodiments of the present disclosure relate generally to an integrated circuit design implemented to efficiently perform operations, such as training and/or interference calculations, associated with artificial intelligence (AI), machine learning (ML), and/or deep learning (DL) applications. Indeed, the integrated circuit design implemented may achieve approximately 100 teraFLOPs (TFLOPs). For example, embodiments of a computationally dense digital signal processing (DSP) circuitry, such as multiply-accumulate (MAC) circuitry, a DSP block, arithmetic circuitry, or a DSP slice (e.g., a portion of a DSP block), implemented to perform one or more arithmetic operations (e.g., a dot-product) on an input are disclosed. Moreover, embodiments described herein may relate to layout, design, and data scheduling of a processing element array implemented to compute matrix multiplications (e.g., systolic array multiplication).

Figure 1:
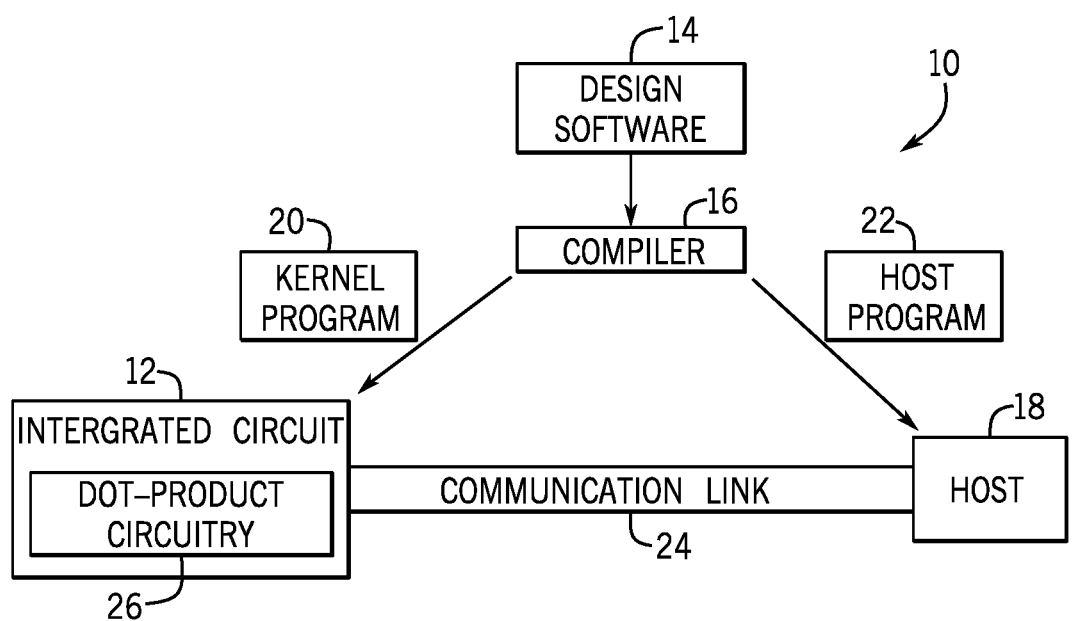
FIG. 1 is a block diagram of a system for implementing dot-product circuitry, in accordance with an embodiment.

With the foregoing in mind, FIG. 1 illustrates a block diagram of a system 10 that may implement arithmetic operations. A designer may desire to implement functionality, such as the dot-product operations of this disclosure, on an integrated circuit device 12 (such as a field-programmable gate array (FPGA) or an application-specific integrated circuit (ASIC)). In some cases, the designer may specify a high-level program to be implemented, such as an OpenCL program, which may enable the designer to more efficiently and easily provide programming instructions to configure a set of programmable logic cells for the integrated circuit device 12 without specific knowledge of low-level hardware description languages (e.g., Verilog or VHDL). For example, because OpenCL is quite similar to other high-level programming languages, such as C++, designers of programmable logic familiar with such programming languages may have a reduced learning curve than designers that may learn unfamiliar low-level hardware description languages to implement new functionalities in the integrated circuit device 12.

The designers may implement their high-level designs using design software 14, such as a version of Intel® Quartus® by INTEL CORPORATION. The design software 14 may use a compiler 16 to convert the high-level program into a lower-level description. The compiler 16 may provide machine-readable instructions representative of the high-level program to a host 18 and the integrated circuit device 12. The host 18 may receive a host program 22 which may be implemented by the kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of dot-product circuitry 26 on the integrated circuit device 12. The dot-product circuitry 26 may include circuitry and/or other logic elements and may be configured to implement, for example, dot-product and/or machine learning operations.

While the techniques described herein relate to the application of a high-level program, in some embodiments, the designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, the examples described herein are intended to be illustrative and not limiting.

Figure 2:
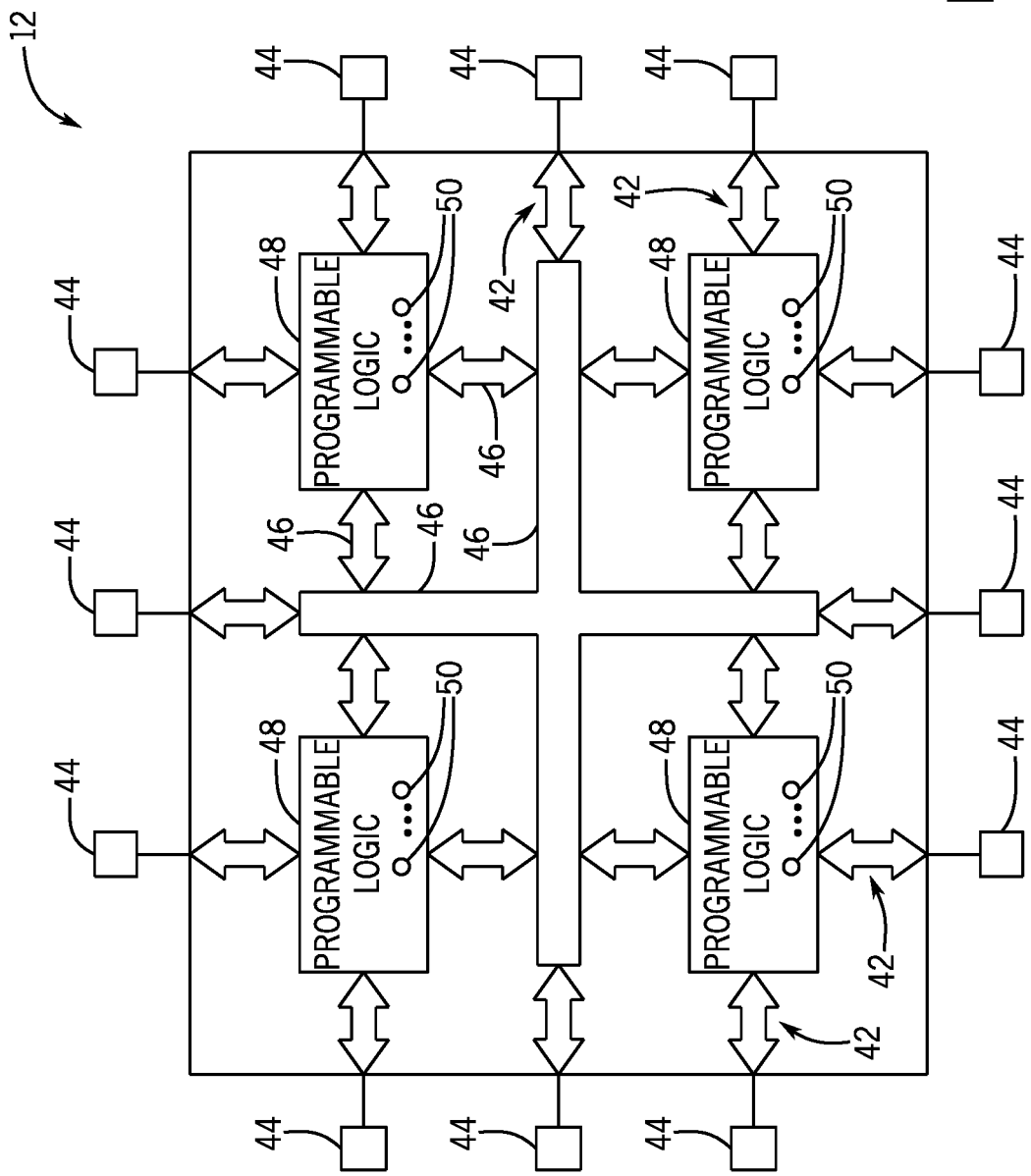
FIG. 2 is a block diagram of an integrated circuit where dot-product circuitry may be implemented, in accordance with an embodiment.

Turning now to a more detailed discussion of the integrated circuit device 12, FIG. 2 illustrates an example of the integrated circuit device 12 as a programmable logic device, such as a field-programmable gate array (FPGA). Further, it should be understood that the integrated circuit device 12 may be any other suitable type of programmable logic device (e.g., an application-specific integrated circuit and/or application-specific standard product). As shown, integrated circuit device 12 may have input/output circuitry 42 for driving signals off device and for receiving signals from other devices via input/output pins 44. Interconnection resources 46, such as global and local vertical and horizontal conductive lines and buses, may be used to route signals on integrated circuit device 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as integrated circuit device 12, may contain programmable elements 50 with the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using pins 44 and input/output circuitry 42. In one embodiment, the memory cells may be implemented as random-access-memory (RAM) cells. The use of memory cells based on RAM technology is described herein is intended to be one example. Further, because these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Figure 3:
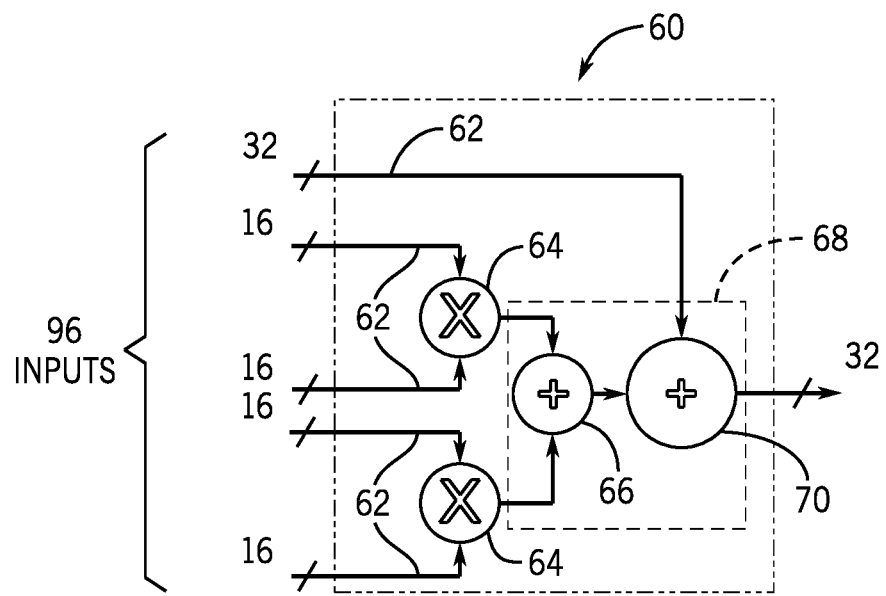
FIG. 3 is a block diagram of digital signal processing (DSP) circuitry, in accordance with an embodiment.

Turning now to FIG. 3, in some embodiments, the integrated circuit device 12 may include digital signal processing (DSP) circuitry 60, such as multiply-accumulate (MAC) circuitry, a DSP block, arithmetic circuitry, or a DSP slice (e.g., a portion of a DSP block), implemented to perform one or more arithmetic operations (e.g., a dot-product) on an input. For example, in some embodiments, the dot-product circuitry 26 may include a number of DSP circuitries 60. Moreover, in some embodiments, the DSP circuitry 60 may include hardened logic (e.g., hardened MAC circuitry, a hardened DSP block, hardened arithmetic circuitry, a hardened DSP slice, and/or the like) that can be used to perform the one or more arithmetic operations, such as vector (e.g., dot-product) computations. In the illustrated embodiment, the DSP circuitry 60 includes input circuitry 62 implemented to receive a number of inputs, which may be formatted according to a suitable number representation, such as bfloat16. Accordingly, each of the inputs may include sixteen bits, where one bit represents a sign bit of a number, eight bits represent an exponent of the number, and seven bits represent a mantissa (e.g., fraction) of the number. Further, after determining the dot-product of the inputs, the DSP circuitry 60 may output a single-precision floating-point (e.g., SP) result, which includes a single sign bit, an 8-bit exponent field, and a 23-bit mantissa field (e.g., thirty-two total bits). The illustrated format of the inputs and outputs, however, is not meant to be limiting. Indeed, the inputs and outputs may take any suitable format.

To perform the one or more arithmetic operations on a set of inputs (e.g., to determine a dot-product of the set of inputs), the DSP circuitry 60 may include a number of multipliers 64. More specifically, as illustrated, the DSP circuitry 60 may include a set of two multipliers 64 suitable to calculate a product based on inputs received in bfloat16 format. Further, to account for potential overflow, the multiplication results may be formatted in a 19-bit number representation. In other embodiments, the multiplication results may remain in the original format of the inputs or may be formatted according to another suitable number format (e.g., single-precision floating-point and/or the like), which may depend on the format of the set of inputs to the DSP circuitry 60.

DSP circuitry 60 may further include a suitable number of adders 66 (e.g., bfloat19 adders) and/or a suitable number of stages of an adder tree 68 to sum the multiplication results. The adders 66 (e.g., adder circuitry) may be implemented to sum the multiplication results according to an internal number format of the DSP circuitry 60, which may be the same or a different format compared to the format of the multiplication results. Further, in some embodiments, a final sum of each of the multiplication results may be determined by, for example, a single-precision adder 70 in the final adder stage of the adder tree 68. Accordingly, the single-precision adder 70 may output a 32-bit result having a 1-bit sign field, an 8-bit exponent field, and a 23-bit mantissa field. Moreover, the DSP circuitry 60 may be implemented to receive a 32-bit input, which may be summed with the result of the adder 66 to produce the final sum. In other embodiments, the final sum may be determined by an adder 66 implemented to produce a result in another number format (e.g., half-precision floating point, FP16+++, an extended precision and/or the like), which may depend on the format of the set of inputs to the DSP circuitry 60, the format used to initially sum the multiplication results, and/or the like.

While the illustrated DSP circuitry 60 is implemented to determine a dot-product, the DSP circuitry 60 may be implemented to perform any suitable multiply-accumulate function and/or other arithmetic operations. Moreover, the format of the input to, the output from, and any intermediate values of the DSP circuitry 60 may be any suitable number format. Accordingly, bfloat16 inputs may be scaled to half-precision floating-point, extended precision inputs may be scaled to single-precision floating-point, among other combinations. Thus, embodiments described herein are intended to be illustrative and not limiting.

In some embodiments, the DSP circuitry 60 may be used to perform computations, such as training and/or inference operations, associated with artificial intelligence (AI), machine learning (ML), deep learning (DL), and/or the like. It may be appreciated that the computations involved with these applications (e.g., AI, ML, DL, and/or the like) may involve a high dataflow. For example, using 10,000 instances of the DSP circuitry 60, 40,000 operations computed at 750 megaHertz (MHz) may achieve 30 teraFlops (TFLOPs). Further, at 600 MHz, 24 TFLOPS may be achieved. However, a set of computations may use higher dataflow and/or additional processing power. In some embodiments, to accommodate higher dataflow, additional DSP circuitries 60 may be employed in the integrated circuit device 12. In other embodiments, because the availability of area and/or wiring connections (e.g., internal and/or external bandwidth) within the integrated circuit device 12 may be limited, additional DSP circuitries 60 may not fit in the integrated circuit device 12. Accordingly, to improve latency involved with these computations and/or increase the internal and/or external bandwidth of the integrated circuit device 12 and/or of the DSP circuitry 60, the DSP circuitry 60 may be restructured to be computationally denser. To that end, the restructured DSP circuitry 60 may use much of the existing architecture, such as wiring connections, of the integrated circuit device 12.

Figure 4:
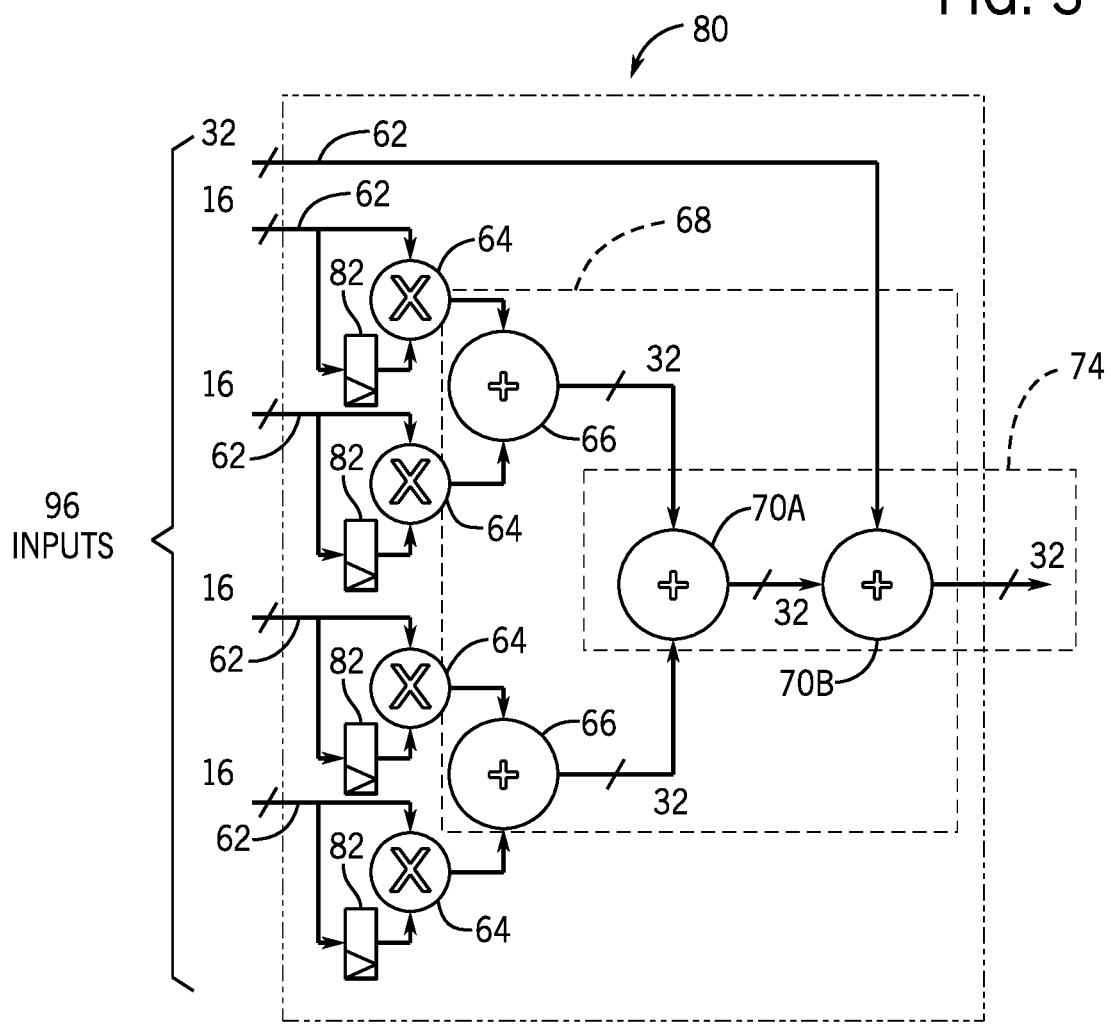
FIG. 4 is a block diagram of a computationally dense digital signal processing (DSP) circuitry, in accordance with an embodiment.

To help illustrate, an embodiment of computationally dense DSP circuitry 80 is shown in FIG. 4. As illustrated, the computationally dense DSP circuitry 80 may include four multipliers 64. To that end, the computationally dense DSP circuitry 80 may include a greater number of multipliers 64 and/or more multiplier circuitry than the DSP circuitry 60. As further illustrated, the computationally dense DSP circuitry 80 may be implemented with the same number of inputs and/or with the same amount of input circuitry 62 as the DSP circuitry 60. Moreover, the input circuitry 62 of the computationally dense DSP circuitry 80 may route an input to both a respective multiplier 64 and a register 82 (e.g., flip-flop, delay mechanism, and/or latch), which may be communicatively coupled to the respective multiplier 64. As further illustrated, the computationally dense DSP circuitry 80 may additionally include two 19-bit adders 66 implemented to sum the products output by the multipliers 64. The sums of the adders 66 may each be routed to a first single-precision adder 70A, which may represent a portion of an accumulator tree 74. A second single-precision adder 70B may sum the output of the single-precision adder 70A with the 32-bit input to produce a final result.

For a vector computation (e.g., matrix multiplication and/or dot product) involving a first input vector and a second input vector, the computationally dense DSP circuitry 80 may be used to load the first input vector while streaming the second input vector. More specifically, the computationally dense DSP circuitry 80 may be used to load the first input vector into the register 82 via the input circuitry 62. Additionally or alternatively, the first input vector may be loaded into an alternative delay structure (e.g., delay mechanism). Subsequently, using the same input circuitry 62, the computationally dense DSP circuitry 80 may stream in the second input vector from memory, a matrix, and/or the like. Upon streaming the second input vector, because the first input vector is already loaded in the registers 82, the computationally dense DSP circuitry 80 may perform matrix multiplication using the first and second input vectors. Moreover, in some embodiments, the computationally dense DSP circuitry 80 may be reconfigured to receive two or three bfloat16 inputs with full connectivity. Accordingly, the computationally dense DSP circuitry 80 may be better able to handle the computations, such as matrix multiplication, involved with AI, ML, DL, and/or the like than the DSP circuitry 60. For example, the computationally dense DSP circuitry 80 may decrease the latency and increase the bandwidth involved with performing these computations while using the same number of inputs (e.g., same amount of input circuitry 62) as the DSP circuitry 60.

Figure 5:
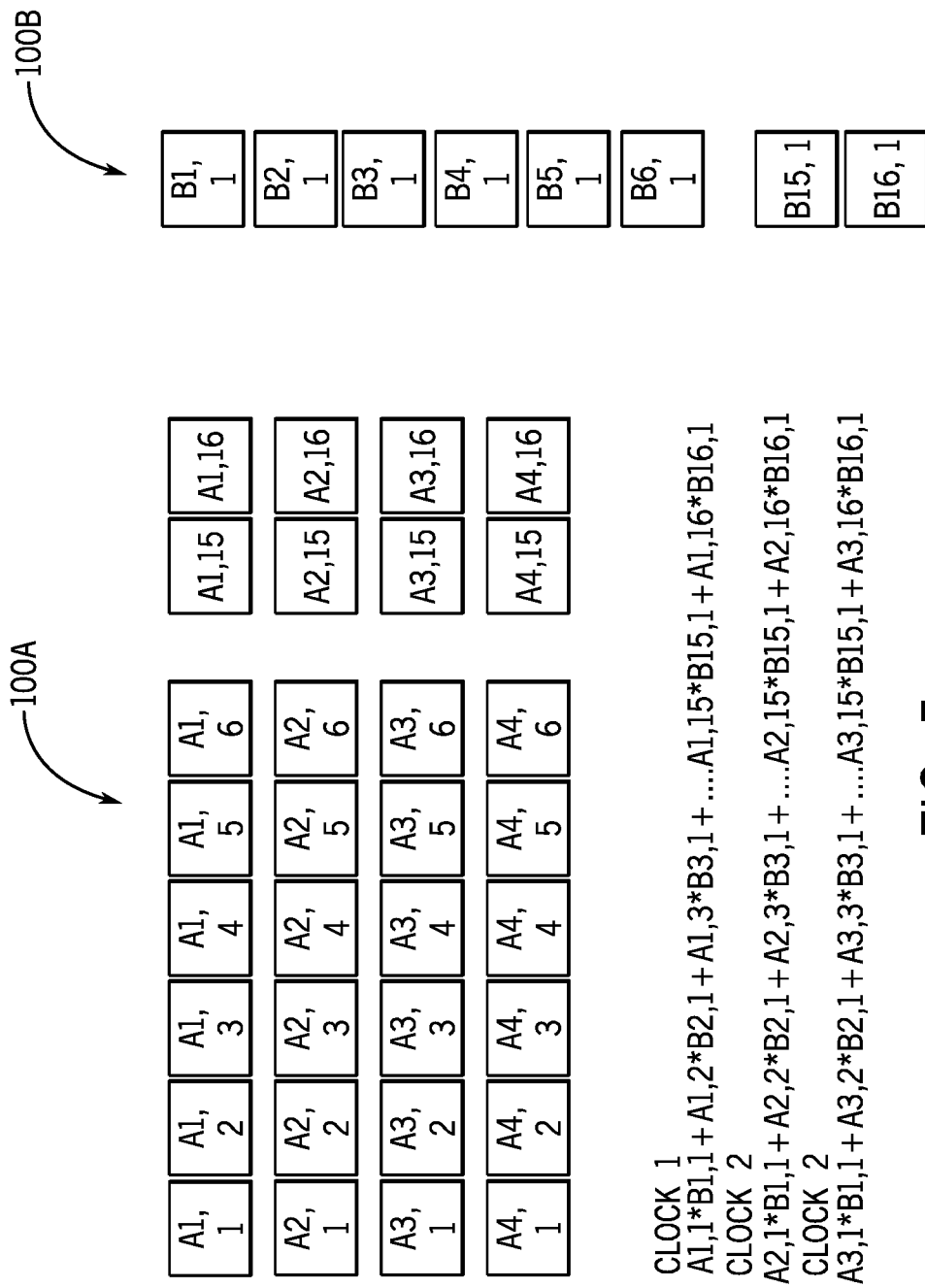
FIG. 5 is a block diagram of a dataflow through the computationally dense DSP circuitry of FIG. 4, in accordance with an embodiment.

Turning to FIG. 5, an example of matrices or portions of matrices (e.g., submatrices) used to compute a dot-product using a dataflow (e.g., a dataflow of 50 TFLOPs) is illustrated. For instance, a dot-product may be computed for a first matrix 100A illustrated to include four rows and sixteen columns (e.g., a 4×16 matrix), and a second matrix 100B illustrated to include sixteen rows and one column (e.g., a 16×1 matrix). More specifically, a number of computationally dense DSP circuitries 80 may be used to compute the dot-product of the first matrix 100A and the second matrix 100B. For example, a first column of the second matrix 100B may be streamed into the computationally dense DSP circuitry 80. Subsequently, a first row of the first matrix 100A may be loaded into the computationally dense DSP circuitry 80 to compute a first inner-product of the dot-product of the first matrix 100A and second matrix 100B. Accordingly, using Clock 1, the inner-product of the first row of the first matrix 100A and the first column of the second matrix 100B may be computed. Similarly, using Clock 2, the inner-product of the second row of the first matrix 100A and the first column of the second matrix 100B may be computed. Moreover, using Clock 2, the inner-product of the third row of the first matrix 100A and the first column of the second matrix 100B may be computed. This scheme may be repeated for the remaining rows of the first matrix 100A and the remaining columns in the second matrix 100B to determine each of the inner-products of the dot-product of the first matrix 100A and second matrix 100B.

While the illustrated embodiments of the first matrix 100A and second matrix 100B include a certain number of rows and columns, a matrix multiplication between matrices having any suitable number of rows and columns (e.g., size) may be performed. For example, a vector operation (e.g., dot-product) may be performed between one or more vectors using the techniques described herein. Thus, embodiments described herein are intended to be illustrative and not limiting. Moreover, in some embodiments, the size of the data (e.g., bit width) included in a particular column or row in a matrix may exceed the number of available inputs (e.g., the bandwidth of the input circuitry 62) in the computationally dense DSP circuitry 80. To that end, an inner-product may be calculated in separate portions (e.g., partial inner-products) that are summed together. Additionally, it may be appreciated that while techniques described herein refer to a row and/or a column of a matrix (e.g., a row vector and/or a column vector, respectively) any suitable vector from a matrix and/or a vector may be used.

Figure 6:
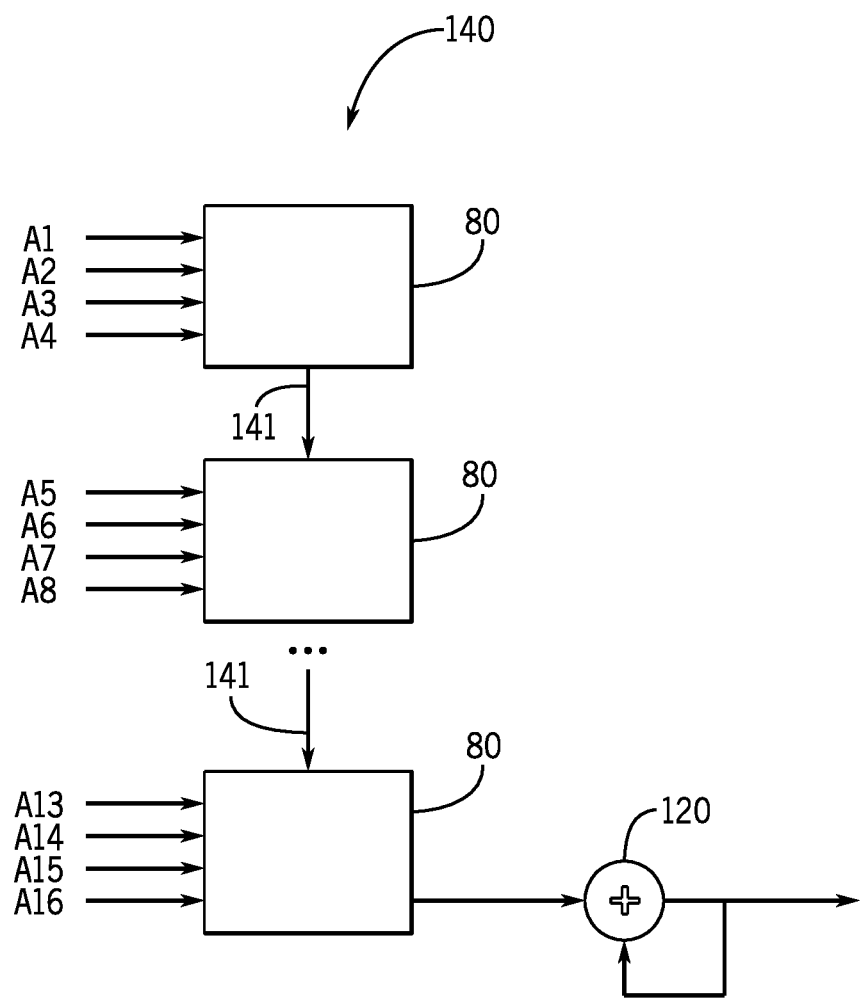
FIG. 6 is a block diagram of a first example of a cascade chain, in accordance with an embodiment.

Accordingly, as illustrated in FIG. 6, a number of computationally dense DSP circuitries 80 and/or DSP circuitries 60 may be cascaded (e.g., in a cascade chain 140) to compute the dot-product or a portion of the dot-product (e.g., an inner-product, a partial inner-product, and/or the like) of a set of matrices, such as the first matrix 100A and the second matrix 100B. In some embodiments, the inter-block connections 141 used to cascade the computationally dense DSP circuitries 80 together may be implemented in hard (e.g., hardened) logic. Accordingly, the performance in a column may be guaranteed. Further, as illustrated, an accumulator 120 may be implemented to sum the results produced by the cascaded computationally dense DSP circuitries 80. In some embodiments, this accumulator 120 may be implemented within a computationally dense DSP circuitry 80 (e.g., using the architecture of the computationally dense DSP circuitry 80).

Moreover, because the cascade chain 140 is implemented with a linear reduction (e.g., cascaded), the accumulator 120 may be implemented to provide an output after a certain delay, which may be determined based in part on the length of the cascade chain 140 (e.g., the number of computationally dense DSP circuitries 80 in the cascade chain 140). For instance, a second computationally dense DSP circuitry 80B may be implemented to determine an output after receiving an input from the first computationally dense DSP circuitry 80A, which is implemented to generate the input with a first latency. Similarly, a third computationally dense DSP circuitry 80C may be implemented to determine an output after receiving an input from the second computationally dense DSP circuitry 80B, which is implemented to generate the input with a second latency. Accordingly, the accumulator 120 may be implemented to provide the output after a delay greater than or equal to the sum of the respective latencies of each of the computationally dense DSP circuitries 80 in the cascade chain 140. To that end, as the length of the cascade chain 140 increases, the delay involved with outputting a result at the accumulator 120 increases.

Figure 7:
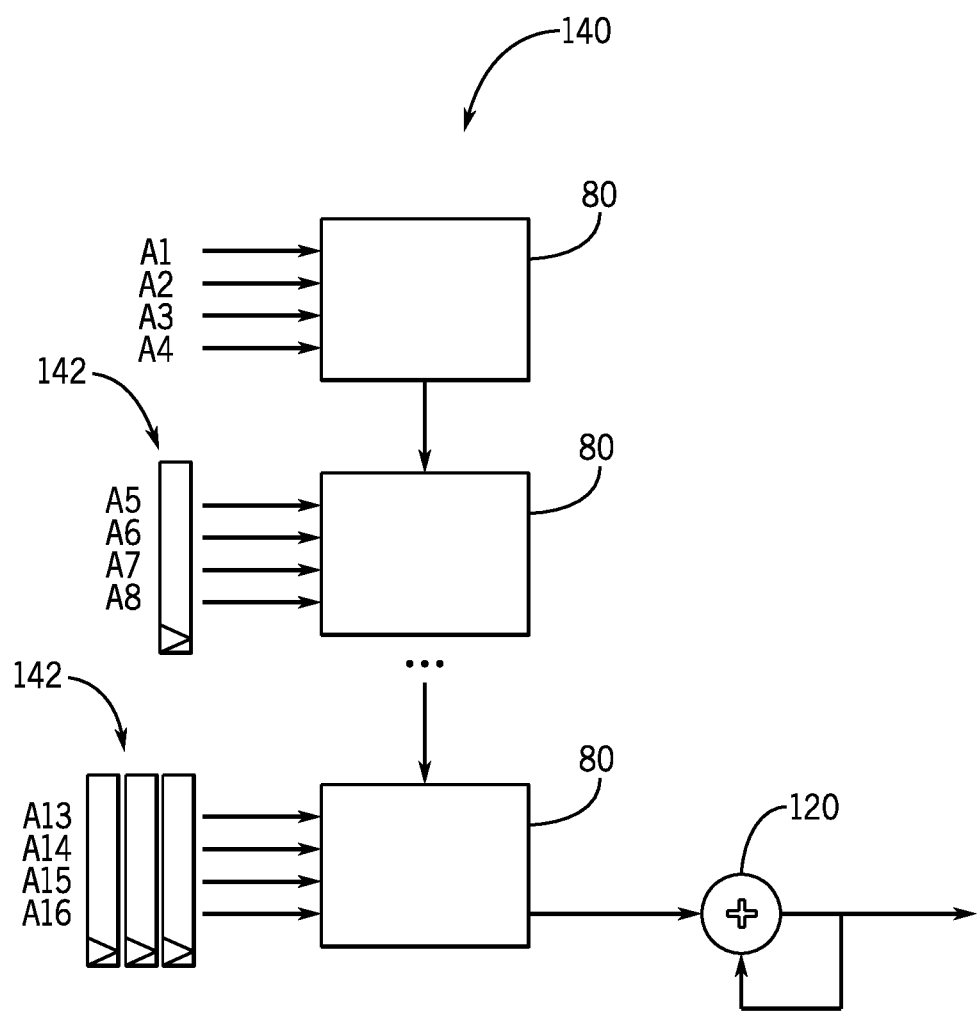
FIG. 7 is a block diagram of a second example of a cascade chain, in accordance with an embodiment.

Accordingly, to reduce the delay involved with determining a result using a cascade chain 140, the inputs in the cascade chain 140 (e.g., carry-chain) may be balanced, as illustrated in FIG. 7. For example, in some embodiments, the cascade chain 140 may include a number of delay chains 142, which may include a set of registers, a first-in, first-out (FIFO) structure, and/or flip-flops (e.g., latches). The delay chains 142 may be implemented such that a set of inputs may be available at a respective computationally dense DSP circuitry 80 concurrently with the output from a previous computationally dense DSP circuitry 80 that is cascaded into the respective computationally dense DSP circuitry 80. However, as the size (e.g., length) of the cascade chain 140 increases, the resources (e.g., time, area, wiring, fabrication costs, and/or the like) used to implement the delay chains 142 may increase. Accordingly, implementing an integrated circuit device 12 with the delay chains 142 may become cumbersome.

Figure 8:
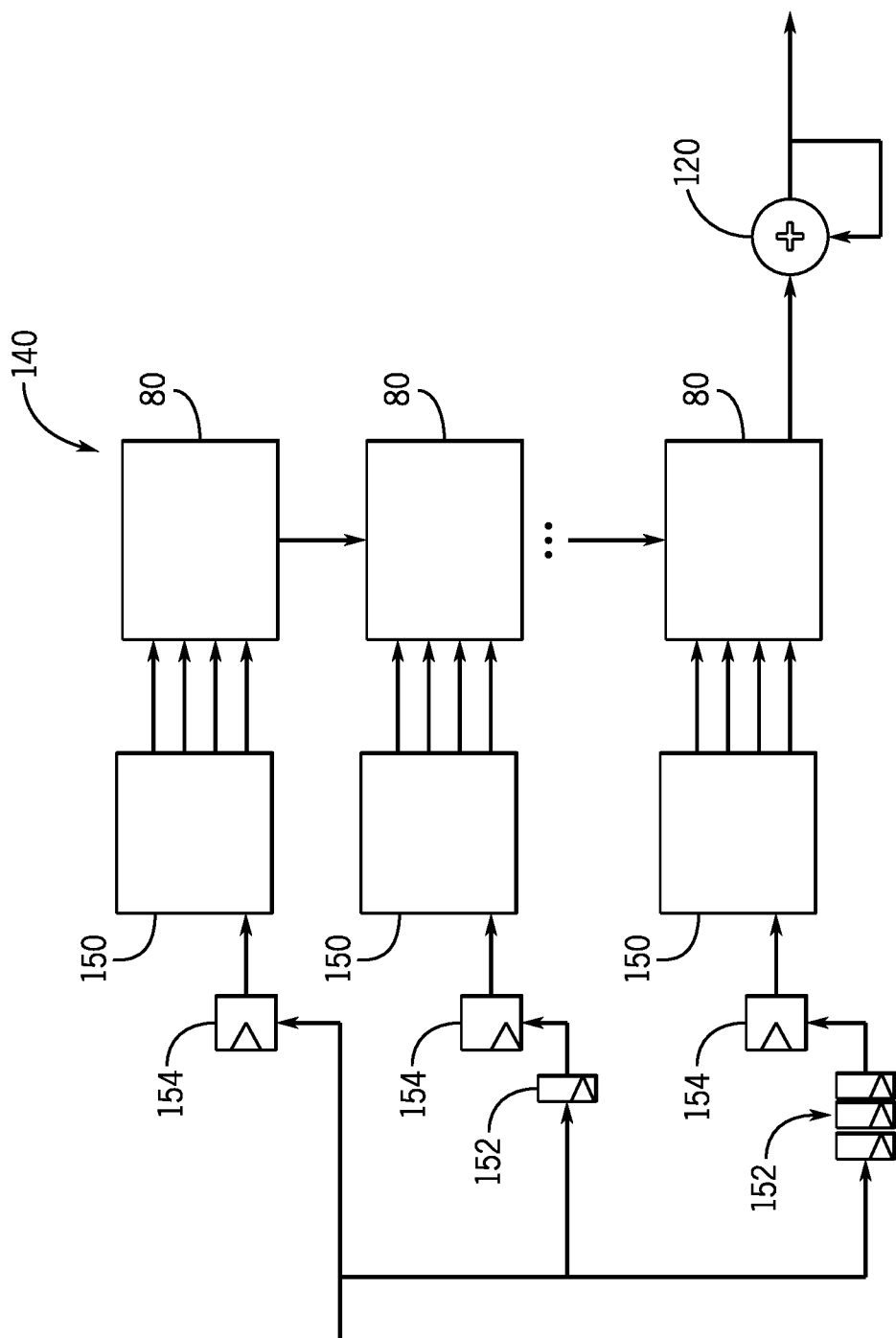
FIG. 8 is a block diagram of a third example of a cascade chain, in accordance with an embodiment.

As such, in some embodiments, the cascade chain 140 may be implemented with a direct connection between an embedded memory block 150, such as a dedicated random-access memory (RAM), and the computationally dense DSP circuitry 80, as illustrated in FIG. 8. More specifically, the cascade chain 140 may be implemented with delayed addressing to the embedded memory block 150, which may be implemented to store the input (e.g., input vector) to the cascade chain 140. For instance, the cascade chain may include an enable bit delay chain 152, which may include a number of delay elements (e.g., latches, flip-flops, and/or the like), and/or a counter 154 (e.g., counter circuitry) implemented to delay access to the embedded memory block 150. As a single enable bit may be delayed to delay access to the embedded memory block, the enable bit delay chains 152 may be implemented with fewer inputs compared to the delay chain 142 of FIG. 7, which may be implemented to delay matrix data that includes a number of bits. To that end, the enable bit delay chains 152 of FIG. 8 may use reduced area and/or resources compared to the delay chains 142 of FIG. 7. Accordingly, the cascade chain 140 illustrated in FIG. 8 may offer improvements related to the balancing of inputs compared to the cascade chain 140 of FIG. 7.

Figure 9:
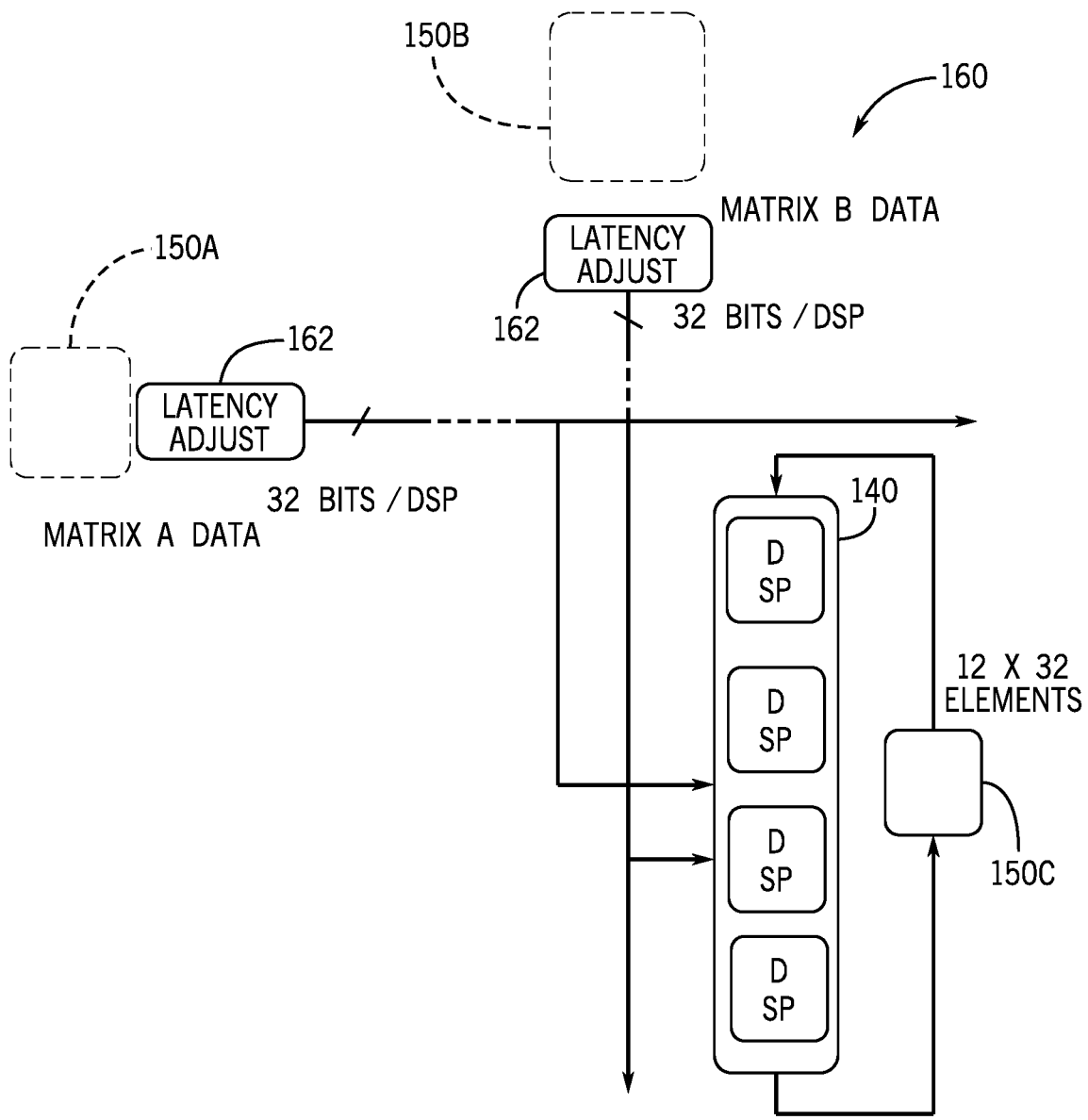
FIG. 9 is a block diagram of a first digital signal processing (DSP) architecture, in accordance with an embodiment.

Turning now to FIG. 9, a block diagram of a tensor mode DSP architecture 160 (e.g., circuitry), which may be implemented on an integrated circuit device 12 (e.g., an FPGA), is illustrated. The tensor mode DSP architecture 160 may be implemented to perform vector computations, such as those involved in AI, ML, DL, and/or the like, with low latency and a high bandwidth. More specifically, as described in greater detail below, the tensor mode DSP architecture 160 may be implemented to use DSP circuitry, such as the computationally dense DSP circuitry 80 to perform matrix multiplication on a first matrix 100A and a second matrix 100B. As illustrated, the tensor mode DSP architecture 160 may include a first set of embedded memory blocks 150A, which may include the data related to the first matrix 100A (e.g., the first input to a dot-product), and a second set of embedded memory blocks 150B, which may include the data related to the second matrix 100B (e.g., the second input to the dot-product). Further, tensor mode DSP architecture 160 may include latency circuitry 162, such as the delay chains 142 and/or latency structures described above with reference to FIGS. 7 and 8, implemented to adjust the latency of data routed from the first set of embedded memory blocks 150A and/or the second set of embedded memory blocks 150B. For example, the latency of data related to the first matrix 100A and/or the second matrix 100B may be adjusted before being input to a cascade chain 140. To that end, as described in greater detail below, certain vectors from the first matrix 100A or the second matrix 100B may be streamed and/or loaded into the cascade chain 140 at different times. Based on the data received from the first matrix 100A and the second matrix 100B, the cascade chain 140 may compute the dot-product of the first matrix 100A and the second matrix 100B. Moreover, as illustrated, to compute the dot-product, the cascade chain 140 may be communicatively coupled to a third set of embedded memory blocks 150C and/or accumulator circuitry, which may each include 12×32 elements. In some embodiments, the third set of embedded memory blocks 150C may accumulate partial inner-products of an inner-product of the dot-product.

Figure 10:
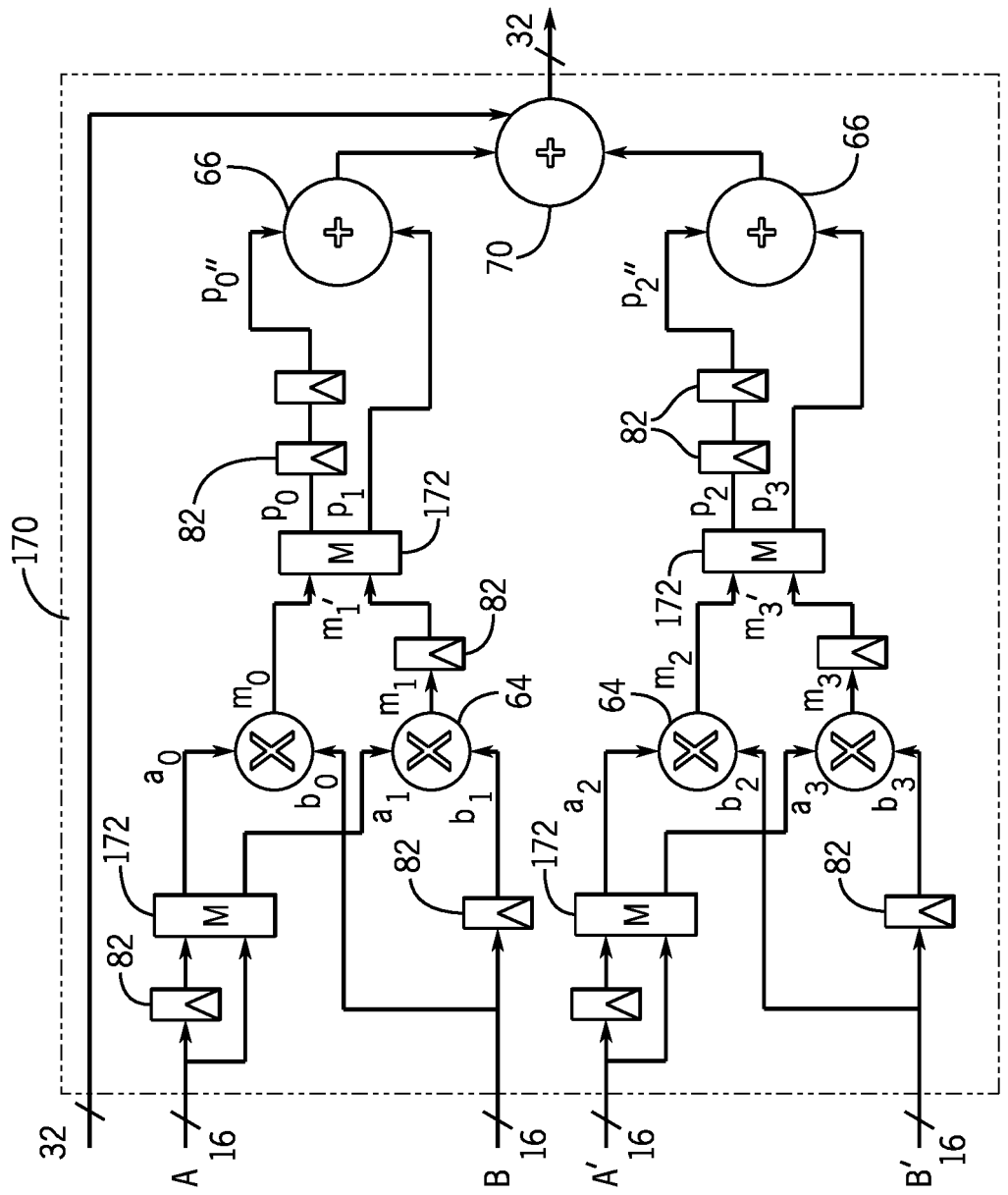
FIG. 10 is an embodiment of a tensor DSP circuitry, which may be included in the first DSP architecture of FIG. 9, in accordance with an embodiment.

FIG. 10 illustrates an embodiment of a tensor DSP circuitry 170, which may be included in the cascade chain 140 of the tensor mode DSP architecture 160 of FIG. 9. As illustrated, the tensor DSP circuitry 170 may be implemented based at least in part on the design of the computationally dense DSP circuitry 80. However, in some embodiments, to integrate the tensor DSP circuitry 170 into the tensor mode DSP architecture 160, the tensor DSP circuitry 170 may be restructured compared to the computationally dense DSP circuitry 80. Accordingly, in some embodiments, the tensor DSP circuitry 170 may be implemented to receive sixty-four input bits, as illustrated. Further, the tensor DSP circuitry 170 may include a set of four multipliers 64, a set of 19-bit adders 66, and a single-precision adder 70. Moreover, the tensor DSP circuitry 170 may include a set of 2-input, 2-output crossbars 172. Further, as described in greater detail below, for a vector computation (e.g., dot product) involving a first input vector (e.g., a column of first matrix) and a second input vector (e.g., a row of a second matrix), the tensor DSP circuitry 170 may be implemented to stream both the first input vector and the second input vector.

Figure 11:
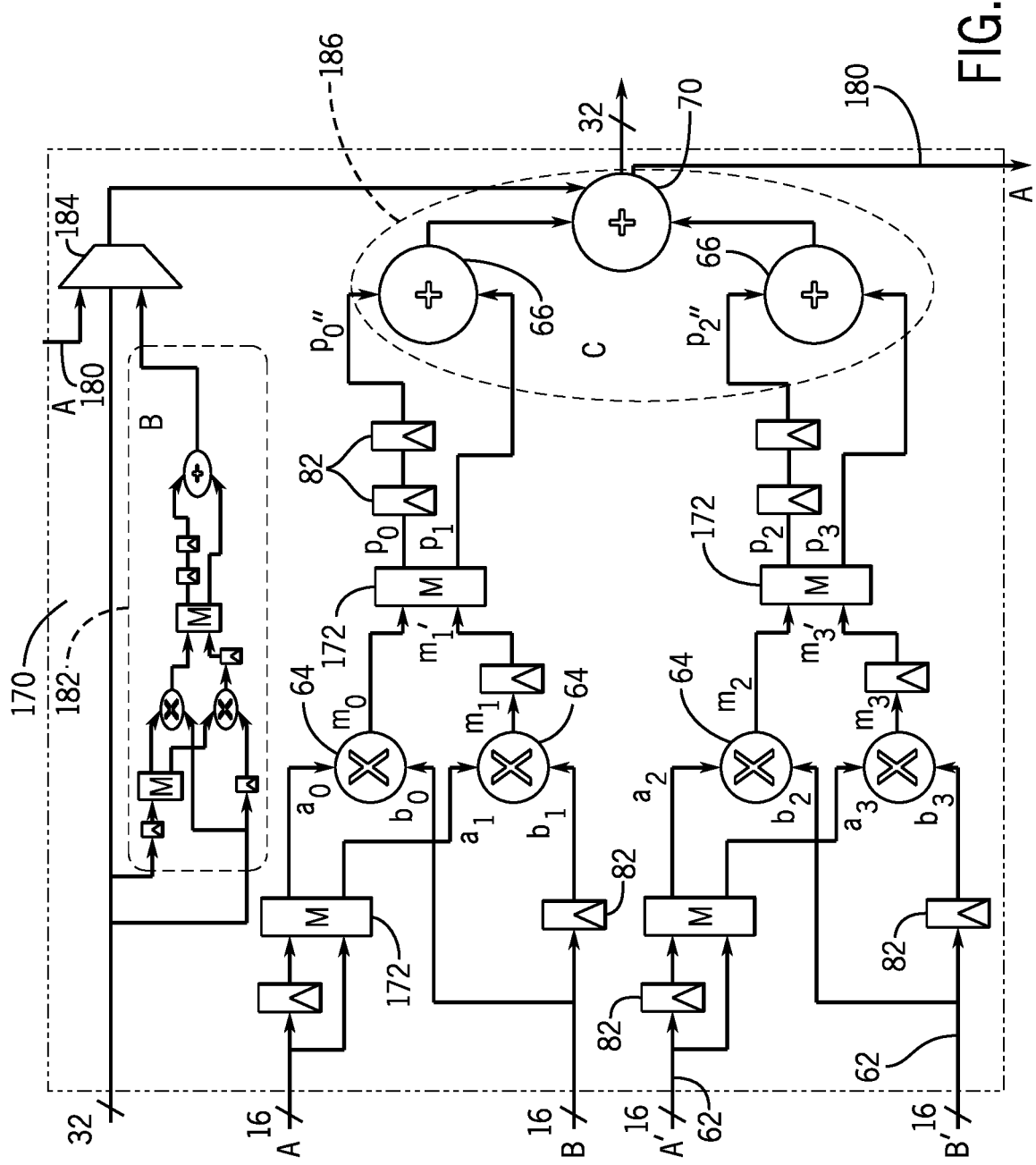
FIG. 11 is an additional embodiment of the tensor DSP circuitry, in accordance with an embodiment.

It may be appreciated that the tensor DSP circuitry 170 may be susceptible to various modifications and alternative forms. For example, as illustrated in FIG. 11, the tensor DSP circuitry 170 may include a carry-chain (e.g., a cascade chain 140) implemented to allow multiple tensor DSP circuitries 170 to be cascaded together. Additionally or alternatively, in some embodiments, the 32-bit input to the single-precision adder 70 may be selectively replaced by an additional set of multipliers 64 included in multiplication circuitry 182. Accordingly, as illustrated, the tensor DSP circuitry 170 may be implemented to select, using selection circuitry 184 (e.g., a multiplexer (mux)), between at least the 32-bit input and the output of multiplication circuitry 182. Further, in some embodiments, the tensor DSP circuitry 170 may be implemented to include a fused adder (not shown), which is described in greater detail below and may perform the addition operations handled by one or more adders (e.g., 66 and/or 70) in the DSP circuitry 170. For example, in some embodiments, the fused adder may be implemented according to IEEE standard 754-2008 format or a custom format to handle the addition operations handled by the 19-bit adders 66 and the single-precision adder 70, which are illustrated as a collective set of adders 186.

Figure 12:
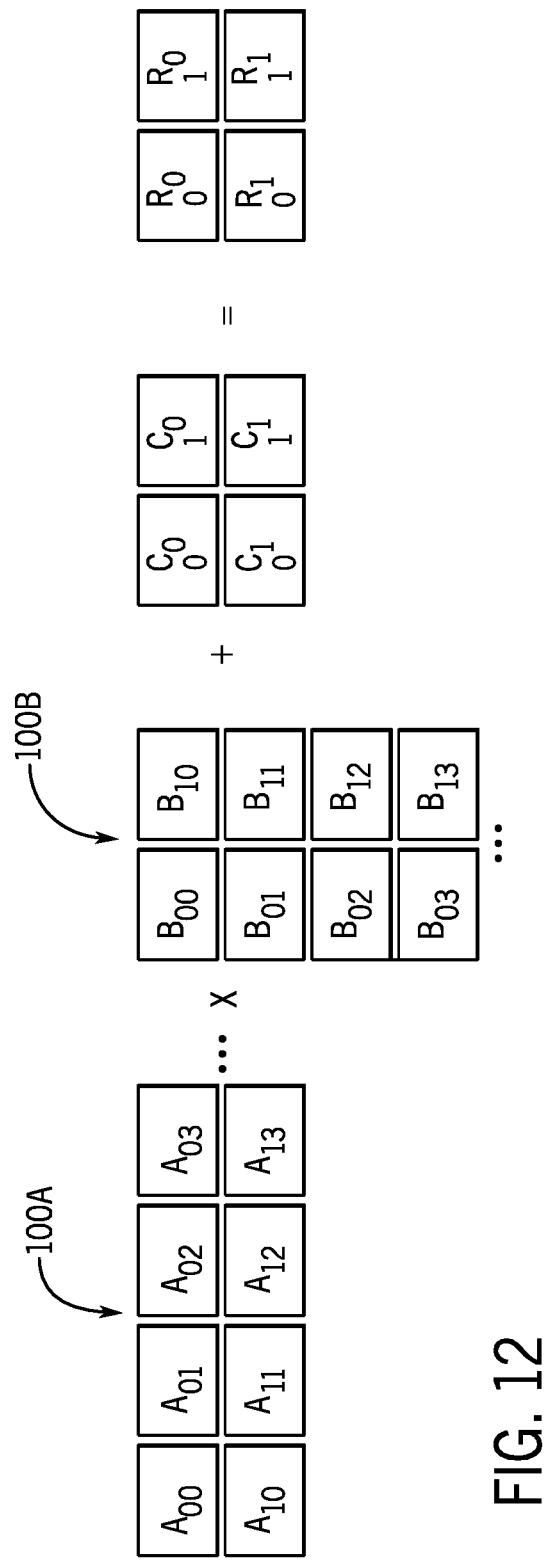
FIG. 12 is a block diagram of a dataflow through the tensor DSP circuitry, in accordance with an embodiment.

Turning now to FIG. 12, an example of the dataflow through the tensor DSP circuitry 170 is illustrated. More specifically, FIG. 12 illustrates a dataflow suitable to multiply the first matrix 100A, which may include two rows and four columns or six columns (e.g., a 2×4 matrix or a 2×6 matrix), by the second matrix 100B, which may include four rows or six rows and two columns (e.g., a 4×2 matrix or a 6×2 matrix), using a single tensor DSP circuitry 170. More generally, the dataflow may be applied to multiply a matrix having two rows and a multiple (N) of four or six columns (e.g., a 2×4N or a 2×6N) matrix by a matrix having the same multiple (N) of four or six rows and two columns (e.g., a 4N×2 or a 6N×2 matrix) by cascading N tensor DSP circuitries 170 through a carry-chain (e.g., cascade chain 140). For example, as illustrated, the products resulting from the multiplication of corresponding elements in the first matrix 100A and the second matrix 100B may be summed with a respective carry-in value (C) routed from the cascade chain 140 to produce a result (R).

Moreover, in some embodiments, the illustrated first matrix 100A and/or second matrix 100B may be portions (e.g., submatrices) of a larger matrix. To that end, the tensor DSP circuitry 170 may be implemented to perform matrix multiplication on a set of matrices by performing matrix multiplication on 2×4N, 2×6N, 4N×2, and/or 6N×2 portions (e.g., submatrices) of each of the set of matrices. That is, for example, the tensor DSP circuitry 170 may be implemented to perform matrix multiplication using a pair of rows and a pair of columns. The size (e.g., 4 elements, 6 elements, and/or the like) of the rows and/or columns may be determined by the number of inputs and/or the implementation of the tensor DSP circuitry 170. Accordingly and as described above with reference to FIG. 9, the result (R) produced by each tensor DSP circuitry 170 may be accumulated and/or stored in the third embedded memory block 150C so that a final dot product of each of the corresponding portions of the set of matrices may be determined.

Figure 13:
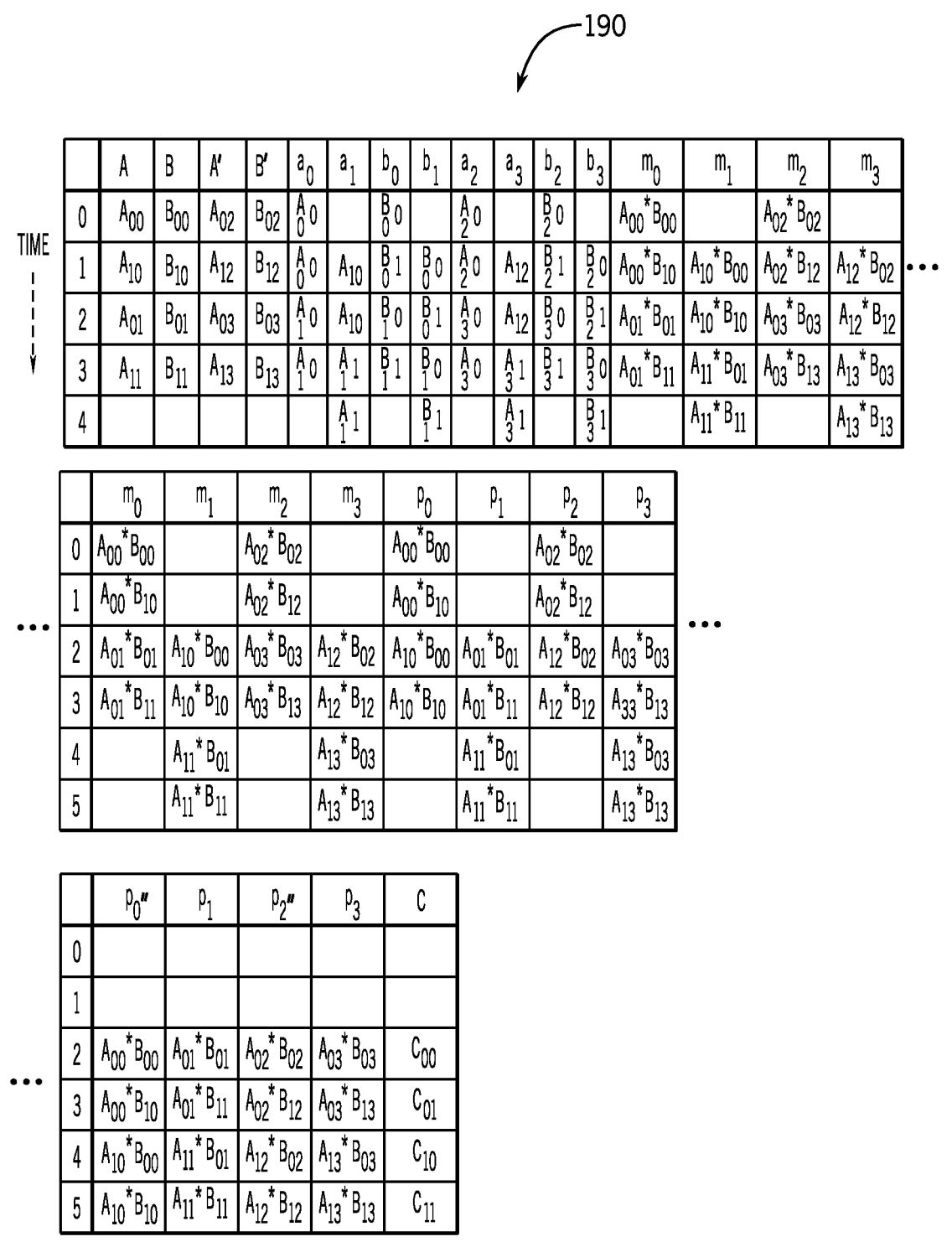

A more detailed embodiment of the dataflow through the tensor DSP circuitry 170 is illustrated in FIG. 13. With reference now to FIG. 10, FIG. 12, and FIG. 13, the table 190 maps the variables (e.g., A, B, A', B', $a_0$, $b_0$, $a_1$, $b_1$, $a_2$, $b_2$, $a_3$, $b_3$, $m_0$, $m_1$, $m_2$, $m_3$, $p_0$, $p_1$, $p_2$, $p_3$, $p_0''$, $p_2''$, C) tapped out from corresponding points in the tensor DSP circuitry 170 to their respective values over time (e.g., over a set of clock cycles) during multiplication of the first matrix 100A illustrated in FIG. 12 and the second matrix 100B illustrated in FIG. 12. Moreover, the result (R) may be produced by summing the values of $p0''$, $p_2''$, and C in a corresponding row. As illustrated, the registers 82 and the 2-input, 2-output crossbars 172 may be implemented to latch and cycle through inputs, respectively, such that each input value from the first matrix 100A and the second matrix 100B may be used in at least two multiplication operations.

Figure 14:
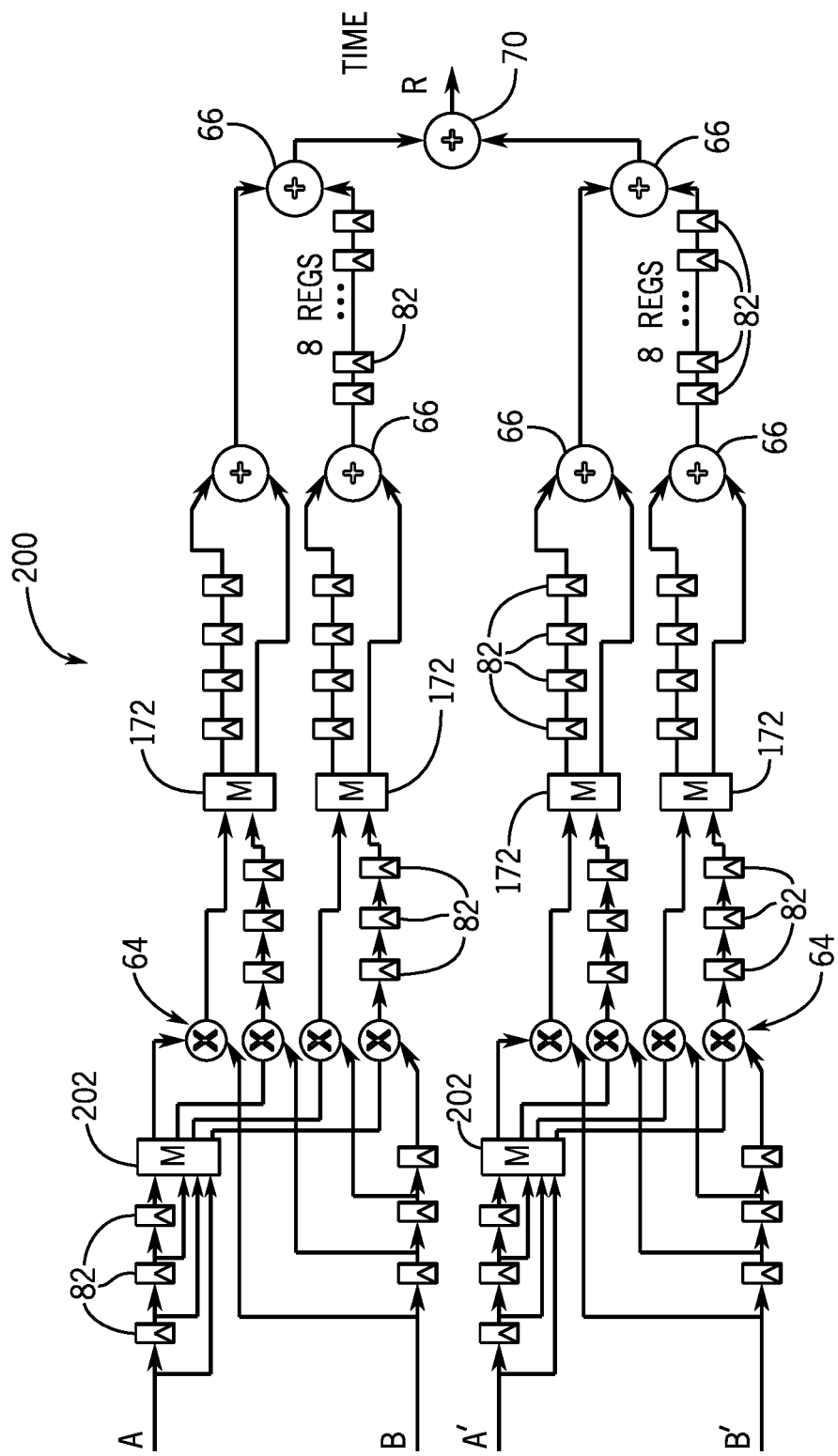
FIG. 14 is a block diagram of high-density tensor DSP circuitry, in accordance with an embodiment.

Turning now to FIG. 14, a high-density tensor DSP circuitry 200 is illustrated. The high-density tensor DSP circuitry 200 may be implemented to receive sixty-four input bits. Further, the high-density tensor DSP circuitry 200 may include eight multipliers 64. Moreover, the high-density tensor DSP circuitry 200 may include a set of 19-bit adders 66 and a set of single-precision adders 70. The high-density tensor DSP circuitry 200 may additionally include a set of 4-input, 4-output crossbars 202, a set of 2-input, 2-output crossbars 172, and a number of registers 82 (e.g., flip-flops and/or latches). Moreover, as described above with reference to FIG. 11, the high-density tensor DSP circuitry 200 may be susceptible to various modifications and alternative forms. Accordingly, in some embodiments the high-density tensor circuitry 200 may include a carry-chain (e.g., cascade chain 140), multiplication circuitry 182, a fused adder, or a combination thereof.

FIG. 15 illustrates an embodiment of dataflow of inputs to and outputs from the high-density tensor DSP circuitry 200. More specifically, the table 210 maps the variables (e.g., A, B, A', B', R) tapped out from corresponding points in the high-density tensor DSP circuitry 200 to their respective values over time during multiplication of the first matrix 100A and the second matrix 100B. With reference to FIGS. 14 and 15, the inputs to the high-density tensor DSP circuitry 200 may be latched by registers 82 and cycled through using, for example, a round-robin cycling, by a combination of the 4-input, 4-output crossbars 202 and the 2-input, 2-output crossbars 172 such that each input value from the first matrix 100A and the second matrix 100B may be used in corresponding dot-product multiplication and addition operations.

Figure 16:
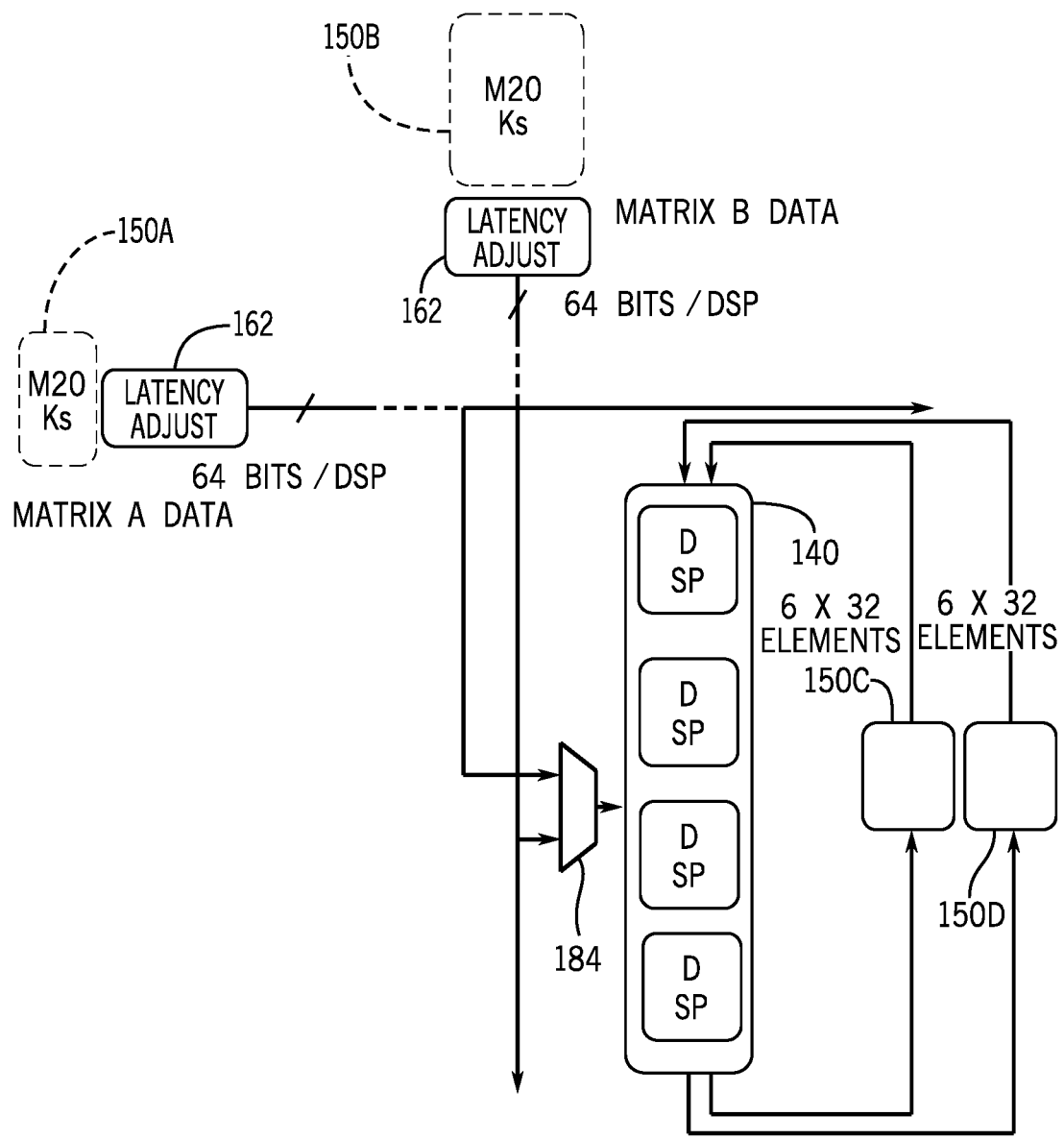
FIG. 16 is a block diagram of a second DSP architecture, in accordance with an embodiment.

Turning now to FIG. 16, a block diagram of a shadow register mode DSP architecture 220 (e.g., circuitry), which may be implemented on an integrated circuit device 12 (e.g., an FPGA), is illustrated. The shadow register mode DSP architecture 220 is a second embodiment of an architecture implemented to perform vector computations, such as those involved in AI, ML, DL, and/or the like, with low latency and a high bandwidth. More specifically, as described in greater detail below and generally described above with reference to the tensor mode DSP architecture 160, the shadow register mode DSP architecture 220 may be implemented to use DSP circuitry, such as the computationally dense DSP circuitry 80 to perform matrix multiplication on a first matrix 100A and a second matrix 100B. As illustrated, the shadow register mode DSP architecture 220 may include a first set of embedded memory blocks 150A, which may include the data related to the first matrix 100A (e.g., the first input to a dot-product), and a second set of embedded memory blocks 150B, which may include the data related to the second matrix 100B (e.g., the second input to the dot-product). Further, shadow register mode DSP architecture 220 may include latency circuitry 162 implemented to adjust the latency of data routed from the first set of embedded memory blocks 150A and/or the second set of embedded memory blocks 150B. For example, the latency of data related to the first matrix 100A and/or the second matrix 100B may be adjusted before being input to a cascade chain 140. In some embodiments, sixty-four bits may be routed from each of the first matrix 100A and the second matrix 100B as inputs to each DSP circuitry in the cascade chain 140. Based on the data received from the first matrix 100A and the second matrix 100B, the cascade chain 140 may compute the dot-product of the first matrix 100A and the second matrix 100B. Moreover, as illustrated, to compute the dot-product, the cascade chain 140 may be communicatively coupled to a third set of embedded memory blocks 150C and a fourth set of embedded memory blocks 150D, which may each include 6×32 elements. In some embodiments, the third set of embedded memory blocks 150C may accumulate a first set of partial inner-products to determine a first inner-product of the dot-product, while the fourth set of embedded memory blocks 150D may accumulate a second set of partial inner-products to determine a second inner-product of the dot-product.

Figure 17:
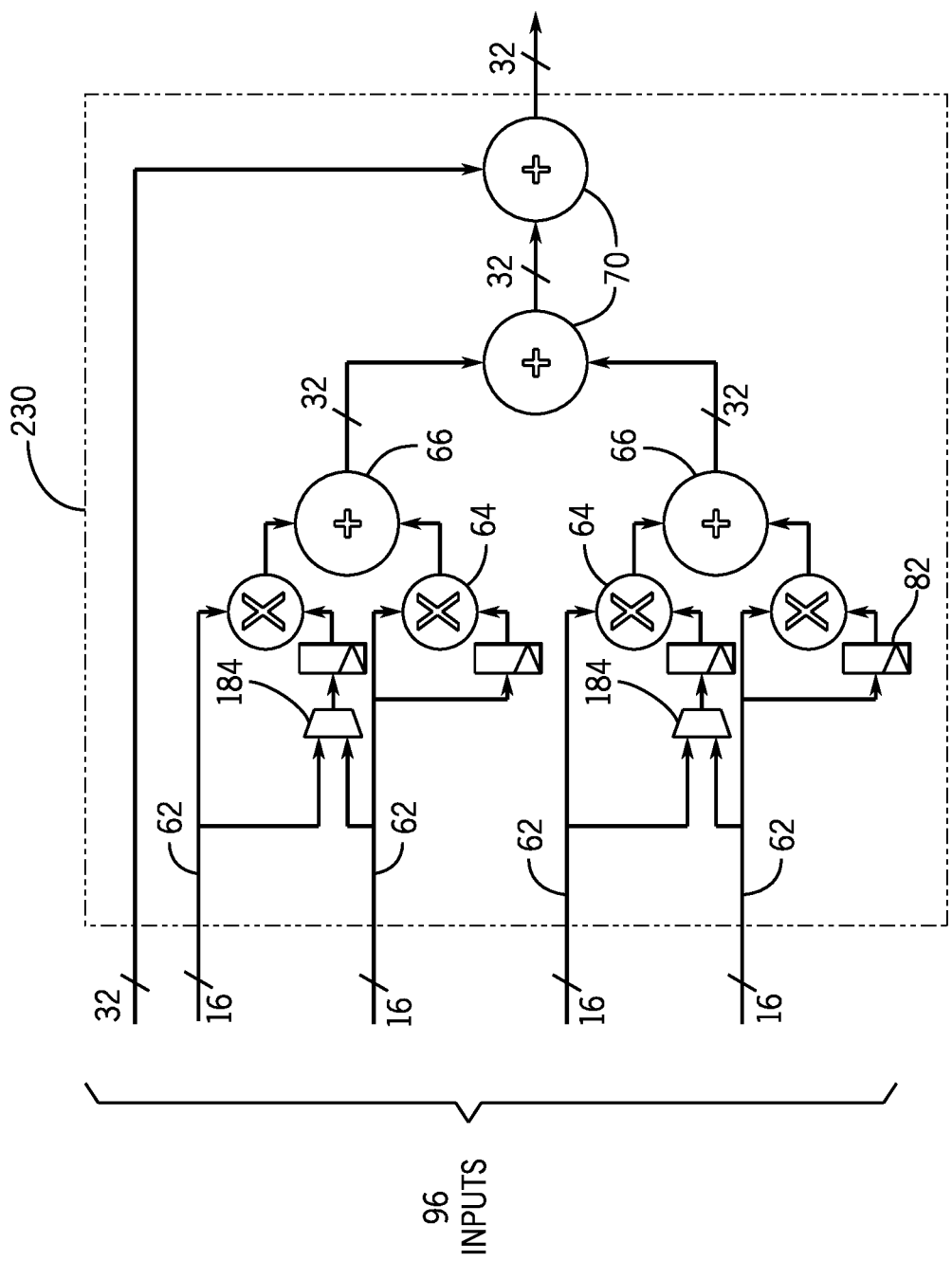
FIG. 17 is a block diagram of a first example of a shadow register DSP circuitry, which may be included in the second DSP architecture, in accordance with an embodiment.

FIG. 17 illustrates a first embodiment of a shadow register DSP circuitry 230, which may be included in the cascade chain 140 of the shadow register mode DSP architecture 220 of FIG. 16. As illustrated, the first embodiment of a shadow register DSP circuitry 230 may be implemented to receive sixty-four input bits corresponding to the first matrix 100A and/or the second matrix 100B. Further, the first embodiment of a shadow register DSP circuitry 230 may include a set of four multipliers 64, a set of 19-bit adders 66, and a set of single-precision adders 70. Further, while not illustrated, the 32-bit input signal received at the first embodiment of a shadow register DSP circuitry 230 may additionally or alternatively be routed (e.g., by selection circuitry and/or a mux) into a remaining (e.g., available) multiplier 64. Additionally, in some embodiments, the illustrated selection circuitry 184 (e.g., muxes) may be communicatively coupled to the input circuitry 62 and may be implemented to select an input output to a register 82. Accordingly, the shadow register DSP circuitry 230 may be implemented to perform other digital signal processing operations in addition to or in the alternative of vector computations. In comparison with the tensor DSP circuitry 170, the first embodiment of a shadow register DSP circuitry 230 may have a simpler dataflow and may be implemented to achieve high routing and/or bandwidth. In some embodiments, however, the tensor mode DSP architecture 160 may be implemented using the tensor DSP circuitry 170 with reduced routing resources (e.g., wiring, input/output (I/O) ports, and/or the like) than a shadow register mode DSP architecture 220 implemented using the shadow register DSP circuitry 230.

Figure 18:
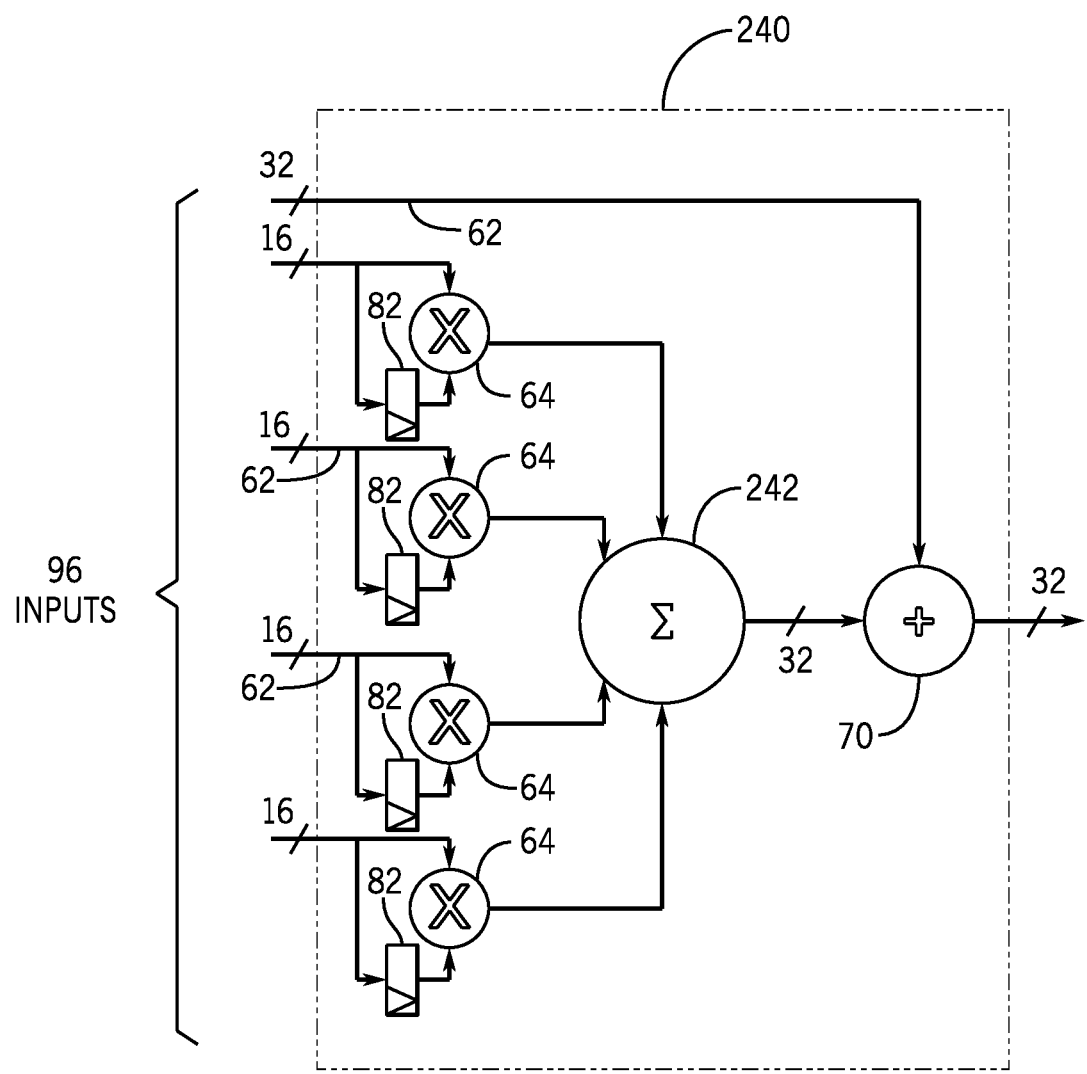
FIG. 18 is a block diagram of second example of a shadow register DSP circuitry, in accordance with an embodiment.

Moreover, the first embodiment of a shadow register DSP circuitry 230 may be susceptible to susceptible to various modifications and alternative forms. For example, FIG. 18 illustrates a second embodiment of a shadow register DSP circuitry 240. The second embodiment of a shadow register DSP circuitry 240 may be implemented to replace a set of single-precision adders 70 with a fused adder 242, such as a floating-point compressor, which may be less expensive to implement in terms of area, current, wiring, and/or the like than individual single-precision adders 70. The fused adder 242 may be implemented according to IEEE standard 754-2008 reduction format or a custom format.

Figure 19:
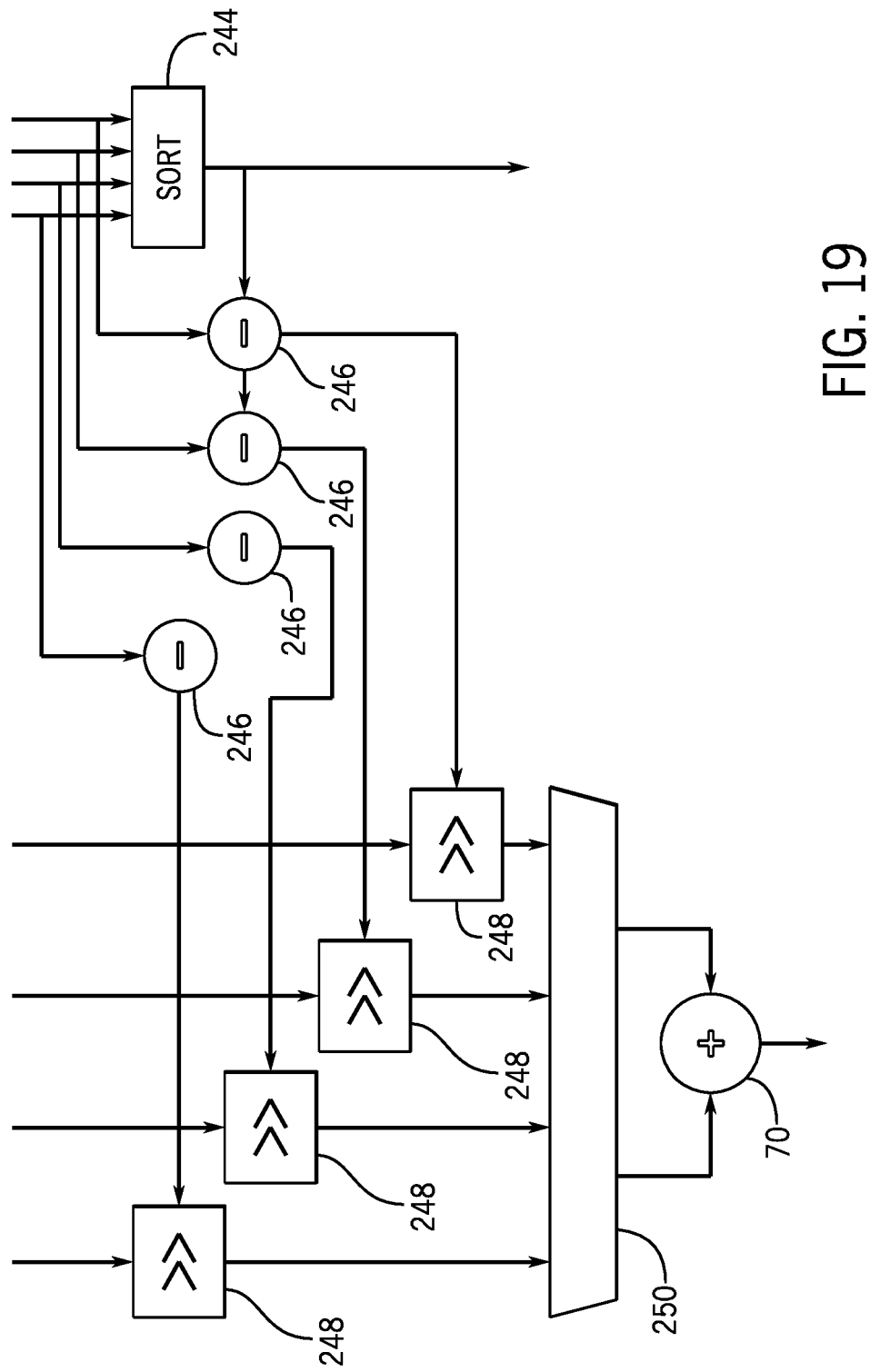
FIG. 19 is a block diagram of a fused adder implemented to perform a reduction operation, in accordance with an embodiment.

As illustrated in FIG. 19, the fused adder 242 may be implemented to perform a reduction operation to handle the arithmetic operations performed by the single-precision adders 70. Accordingly, the fused adder 242 may include sorting circuitry 244, a number of subtractors 246 (e.g., comparators), a number of right-shift circuitries 248, a compressor 250, an adder 70, and/or the like. To that end, the sorting circuitry 244 may be implemented to sort the exponents of the inputs to the fused adder 242 to identify the exponent having the highest value from among the exponents of the inputs. Using the subtractors 246, the fused adder 242 may then determine, for each of the exponents of the inputs, the difference between the respective exponent of an input and the identified exponent having the highest value. The right-shift circuitries 248 may then shift the respective exponents of the inputs to the fused adder 242 by the respective difference determined by the corresponding subtractor 246 so that each exponent is shifted to the same order of magnitude. The compressor 250 (e.g., an N:2 compressor) may then compress each of the inputs to the fused adder 242 so that the adder 70 may determine a sum. The sum may then be renormalized based at least in part on the identified exponent having the highest value.

Figure 20:
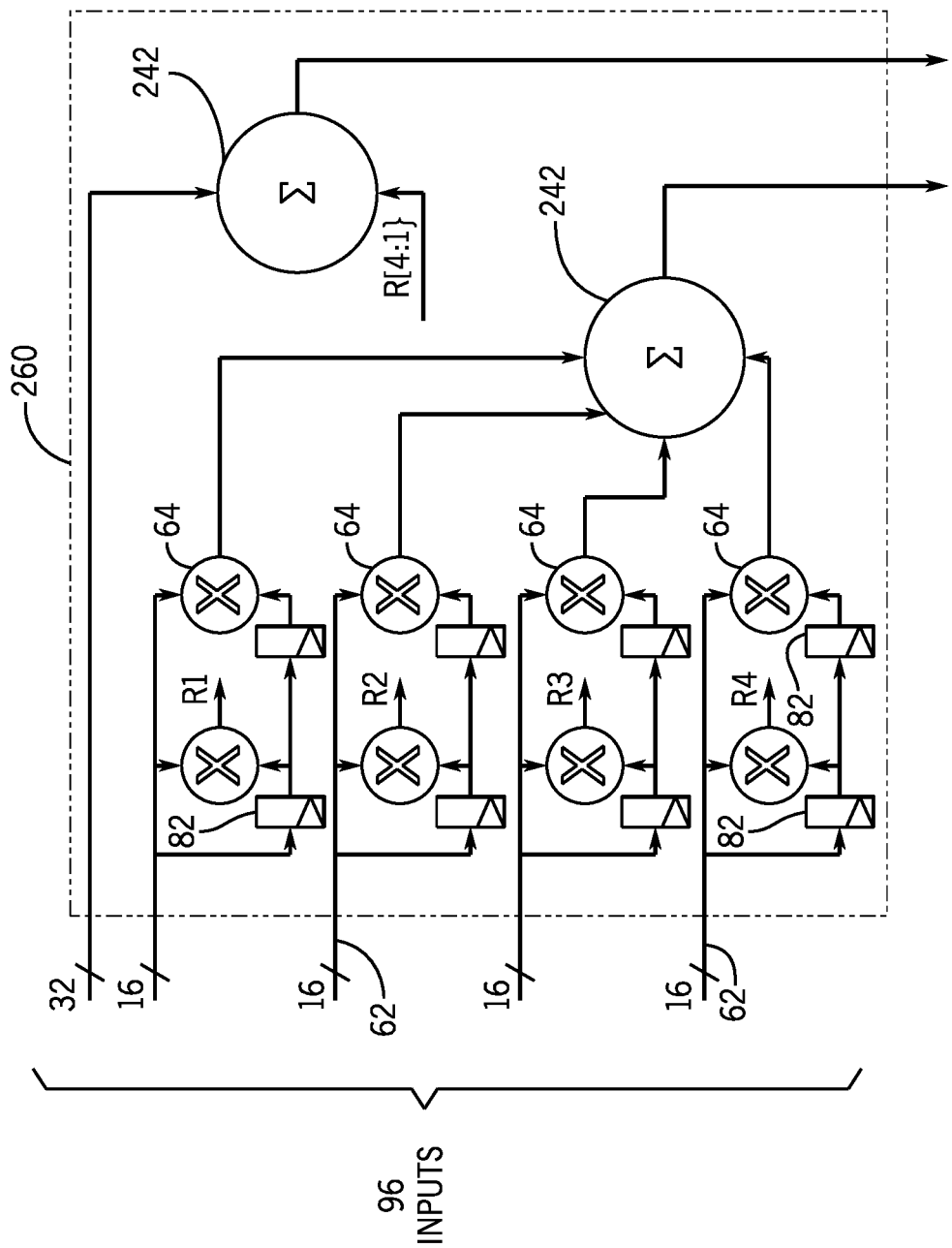
FIG. 20 is a block diagram of a dual-channel DSP circuitry, in accordance with an embodiment.

Turning now to FIG. 20, a dual channel DSP circuitry 260, which may represent a third embodiment of a shadow register DSP circuitry, is illustrated. As illustrated, the dual channel DSP circuitry 260 may include a set of multipliers 64, a set of registers 82, and a set of fused adders 242. Further, the dual channel DSP circuitry 260 may be implemented to load two vectors in series. Moreover, the dual channel DSP circuitry 260 may be implemented to calculate two independent inner-products. To that end and as described above with reference to the third and fourth embedded memory blocks 150 (e.g., 150C and 150D, respectively) of FIG. 16, the independent inner-products may be accumulated separately. Additionally, in some embodiments, the dual channel DSP circuitry 260 may be implemented to reuse vector mode cascading connections (e.g., interblock connections), as described in greater detail below. Accordingly, issues with redundancy may be prevented and/or reduced. Further, in some embodiments, the dual channel DSP circuitry 260 may be implemented to revert to lower performance modes (e.g., to achieve fewer TFLOPs).

Figure 21:
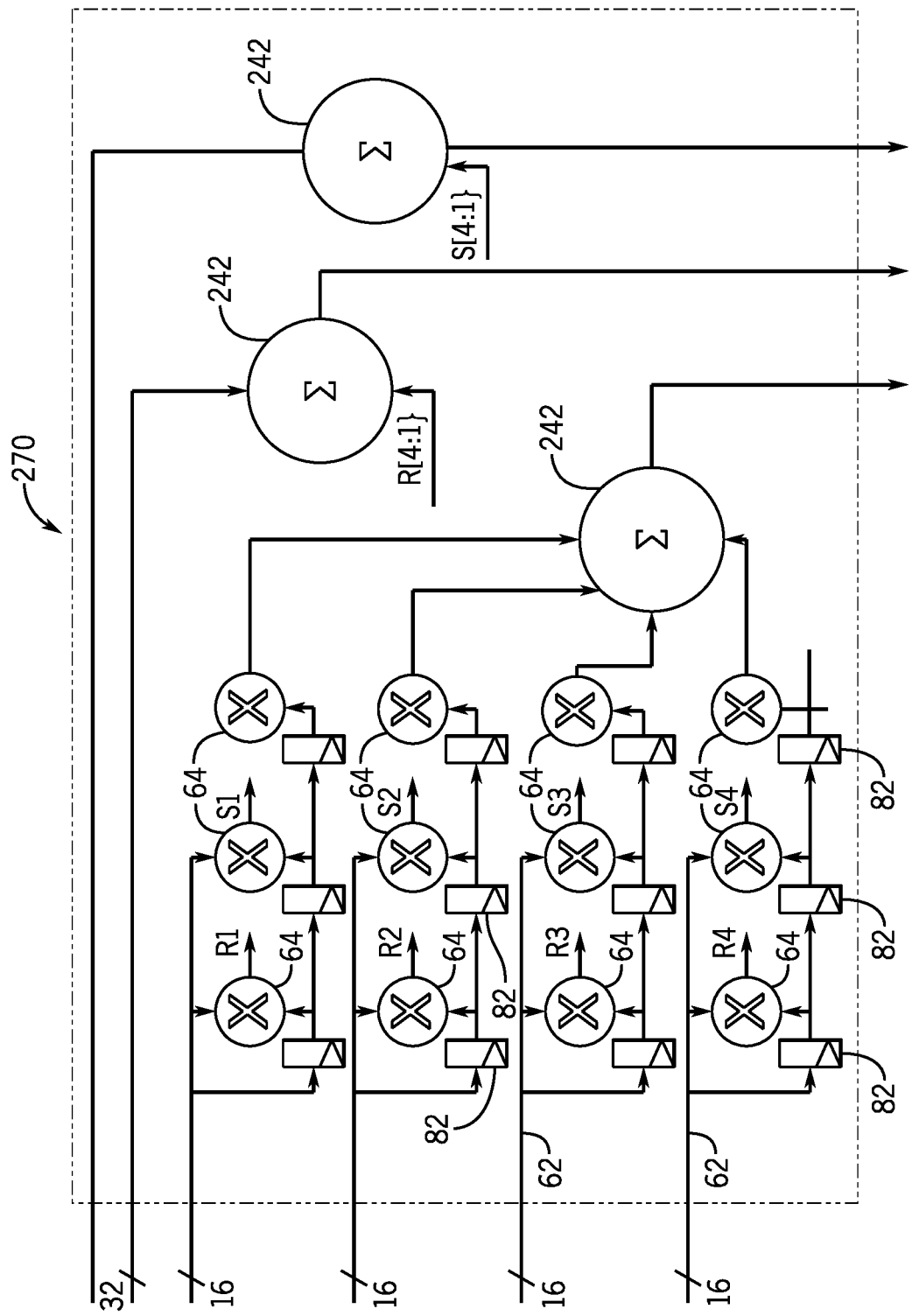
FIG. 21 is a block diagram of a multi-channel DSP circuitry, in accordance with an embodiment.

Moreover, the architecture implemented in the dual channel DSP circuitry 260 may be expanded to implement multi-channel DSP circuitry 270, as illustrated in FIG. 21. As illustrated, the multi-channel DSP circuitry 270 may be implemented to load three vectors in series. Moreover, the multi-channel DSP circuitry 270 may be implemented to calculate three independent inner-products. In other embodiments, the multi-channel DSP circuitry 270 may be implemented to calculate fewer or additional independent inner-products. Thus, embodiments are intended to be illustrative and not limiting. It may be appreciated, however, that the space available in the integrated circuit device 12 may determine a maximum number of independent inner-products that the multi-channel DSP circuitry 270 may be implemented to calculate.

Figure 22:
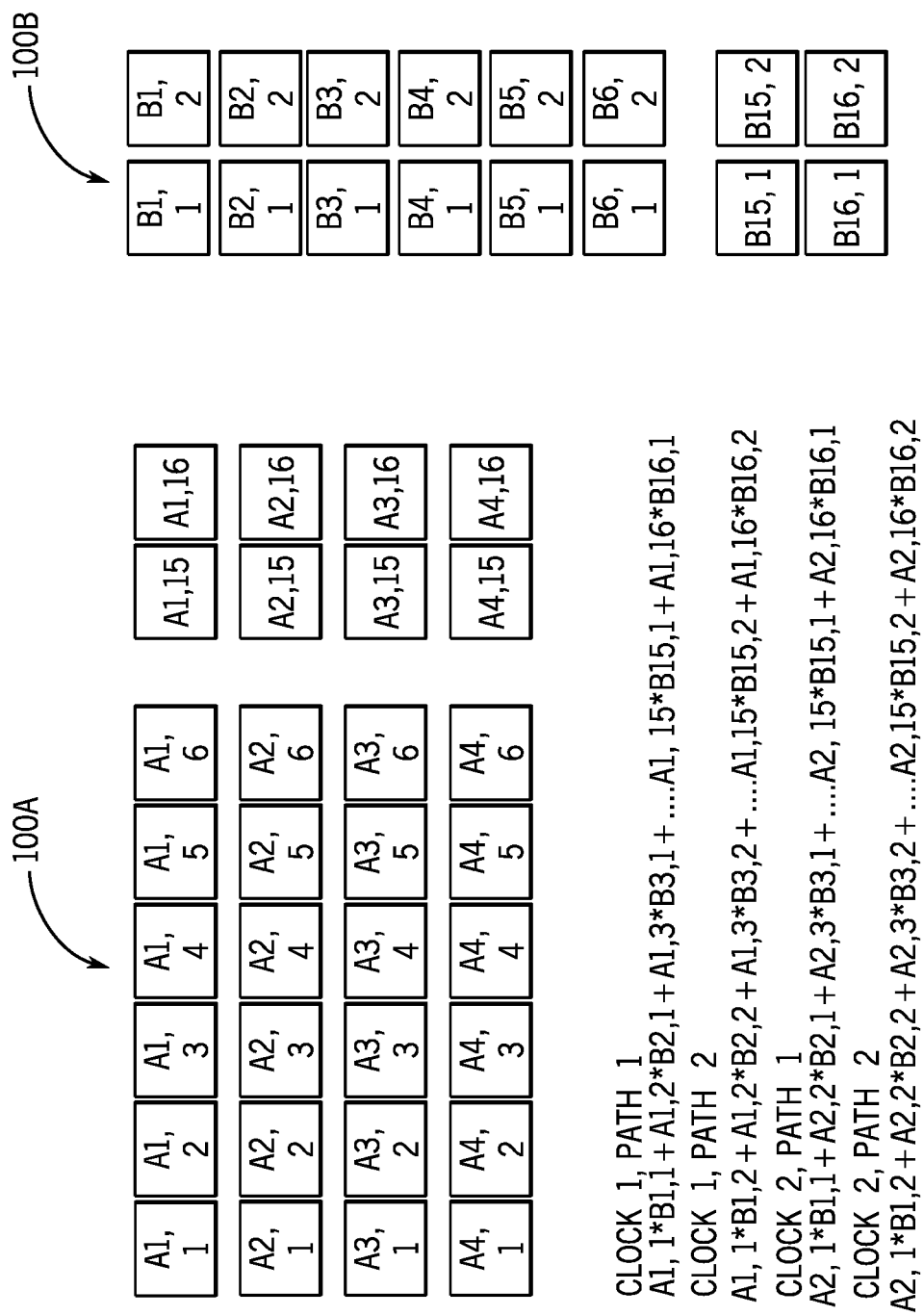
FIG. 22 is a block diagram of a dataflow through the dual-channel DSP circuitry or the multi-channel DSP circuitry, in accordance with an embodiment.

FIG. 22 illustrates an example high-performance (e.g., 100 TFLOPs) parallel dataflow facilitated by the DSP circuitry (e.g., 230, 240, 260, 270) of the shadow register mode DSP architecture 220. As illustrated, a dot-product may be computed for the first matrix 100A, which may include four rows and sixteen columns (e.g., a 4×16 matrix), and the second matrix 100B, which may include sixteen rows and two column (e.g., a 16×2 matrix). More specifically, a number of DSP circuitry (e.g., 230, 240, 260, 270) of the shadow register mode DSP architecture 220 may be used to compute the dot-product of the first matrix 100A and the second matrix 100B at 100 TFLOPs using the illustrated clocking scheme. For example, using Clock 1, Path 1 the inner-product of the first row of the first matrix 100A and the first column of the second matrix 100B may be computed. Similarly, using Clock 1, Path 2 the inner-product of the first row of the first matrix 100A and the second column of the second matrix 100B may be computed. Moreover, using Clock 2, Path 1, the inner-product of the second row of the first matrix 100A and the first column of the second matrix 100B may be computed, and using Clock 2, Path 2, the inner-product of the second row of the first matrix 100A and the second column of the second matrix 100B may be computed. This scheme may be repeated for the remaining rows of the first matrix 100A (e.g., the third row through the sixteenth row).

Figure 23:
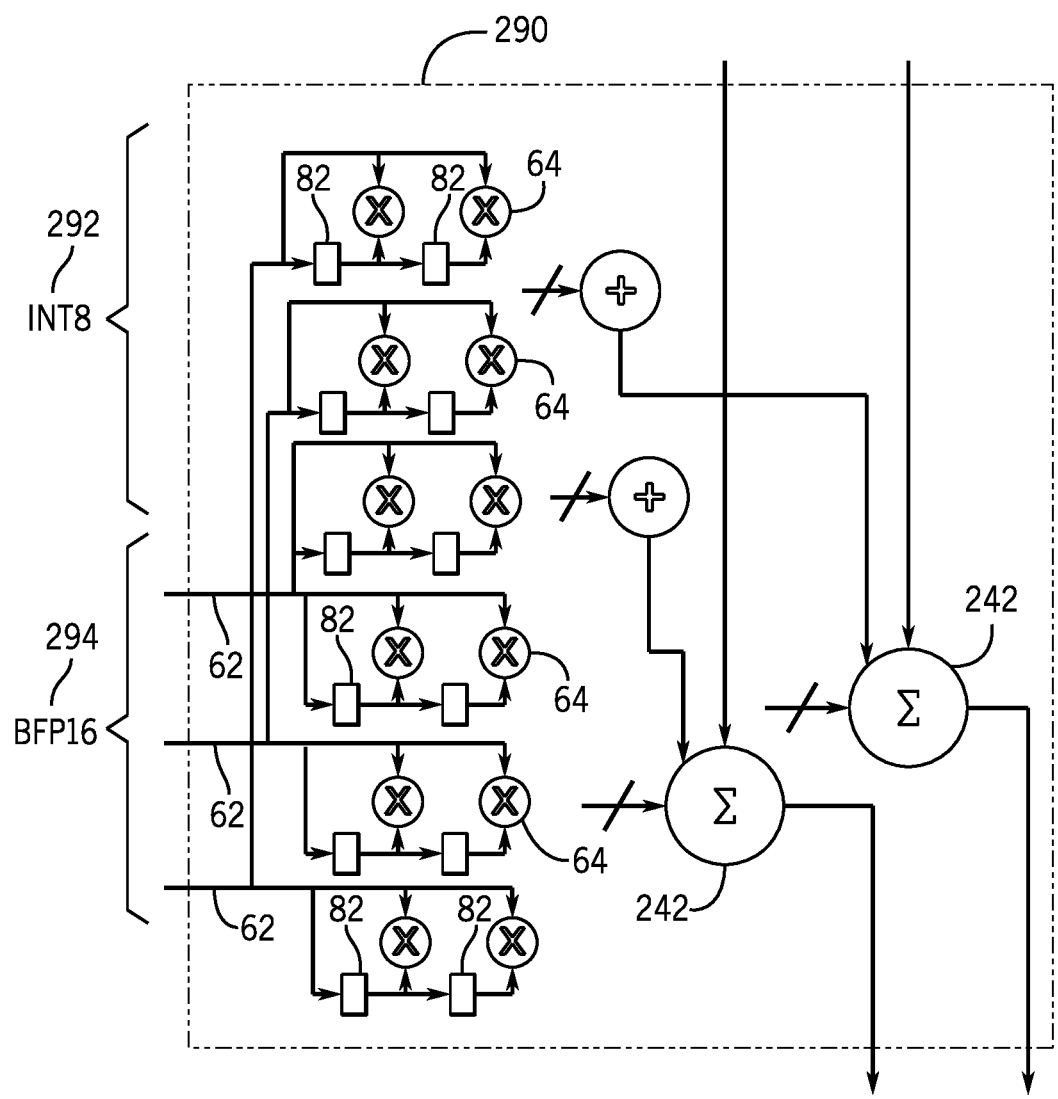
FIG. 23 is a block diagram of an inference and training circuitry 290, in accordance with an embodiment.

Turning now to FIG. 23, an inference and training circuitry 290 (e.g., a DSP circuitry) is illustrated. The inference and training circuitry 290 may contain an 8-bit integer (INT8) structure 292 and a bfloat16 structure 294. In some embodiments, the bfloat16 structure 294 may be implemented to receive inputs formatted according to bfloat16. Moreover, the bfloat16 structure 294 may contain a number of registers 82 and a number of registers 84. The INT8 structure 292 may be implemented to receive inputs formatted as 8-bit integers and may be implemented with the same arrangement as the bfloat16 structure 294. Accordingly, in some embodiments, the multipliers 64 of the INT8 may be implemented as bfloat16 multipliers. However, in such embodiments, the multipliers 64 of the INT8 structure 292 may be implemented to ignore the logic and/or circuitry associated with exponent calculations. Further, the outputs of the multipliers 64 of each of the INT8 structure 292 and the bfloat16 structure 294 may be routed to adders (e.g., 66, 70) and/or a fused adder 242. Accordingly, the outputs of the multipliers 64 of the INT8 structure 292 may be added to the outputs of the multipliers 64 of the bfloat16 structure 294, which may act as INT8 outputs, as described in greater detail below.

Figure 24:
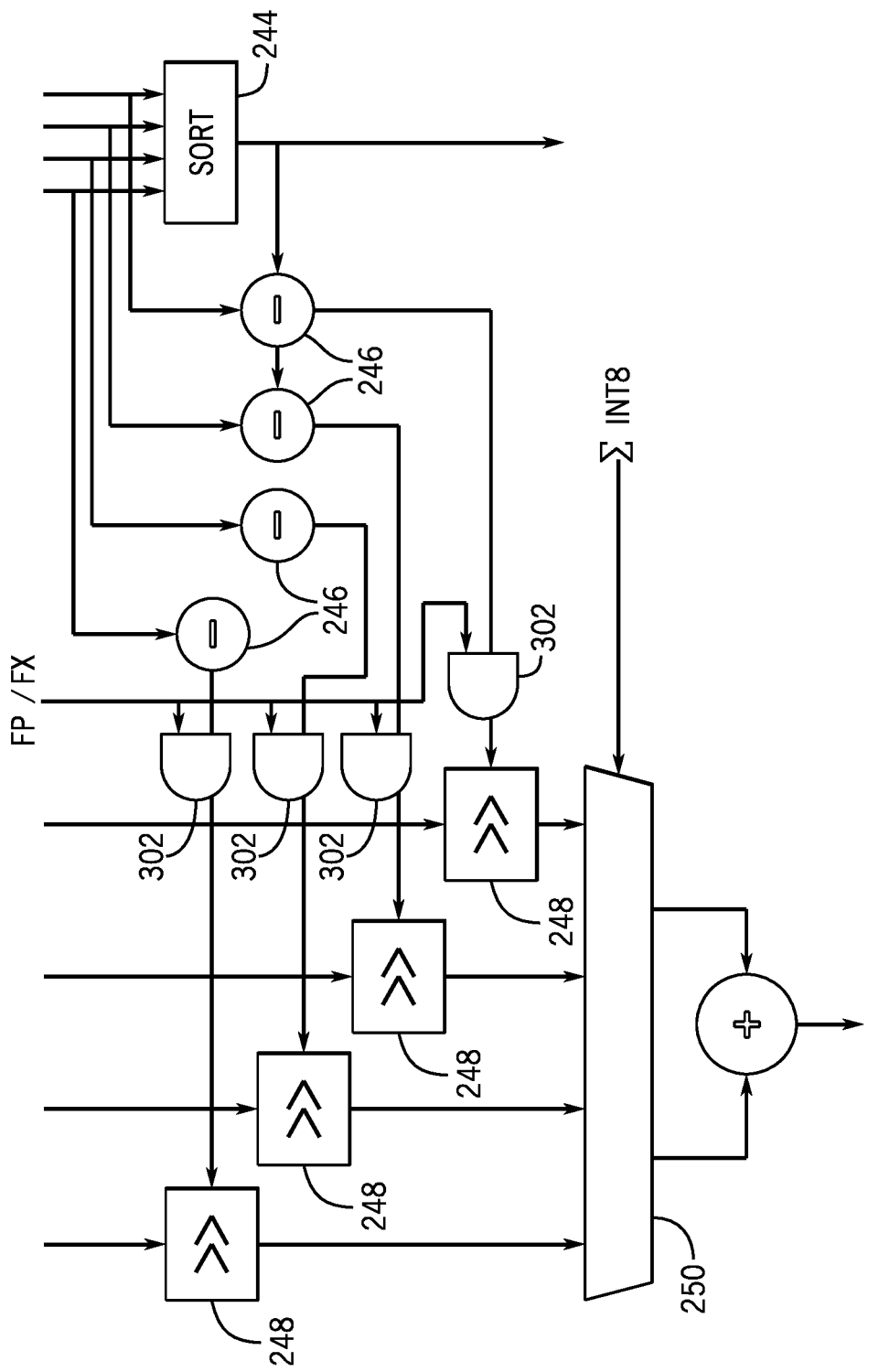
FIG. 24 is a block diagram of the fused adder implemented to perform an additional reduction operation, in accordance with an embodiment.

More specifically, as illustrated in FIG. 24, the fused adders 242 of the inference and training circuitry 290 may be implemented to reconfigure single-precision floating-point sum structures to INT8 sum structures. As illustrated, the fused adders 242 may include a number of logic gates 302 (e.g., logical AND gates) implemented to zero all shifts. Accordingly, the exponents of each of the inputs to a fused adder 242 may be the same relative to one another (e.g., normalized). Moreover, the fused adders 242 may be implemented to use a compressor 250. The sum of INT8 values (e.g., ΣINT8) generated by the INT8 structure 292 and/or the bfloat16 structure 294 may be routed into the compressor 304. In some embodiments, the sum of INT8 values may be represented in redundant form when it is routed into the compressor 304. The compressor 250 may then, using redundant form arithmetic, for example, compress the integer weights of the input values so that the adder 70 may determine a sum. In some embodiments, the sum may then be renormalized based at least in part on the identified exponent having the highest value.

Figure 25:
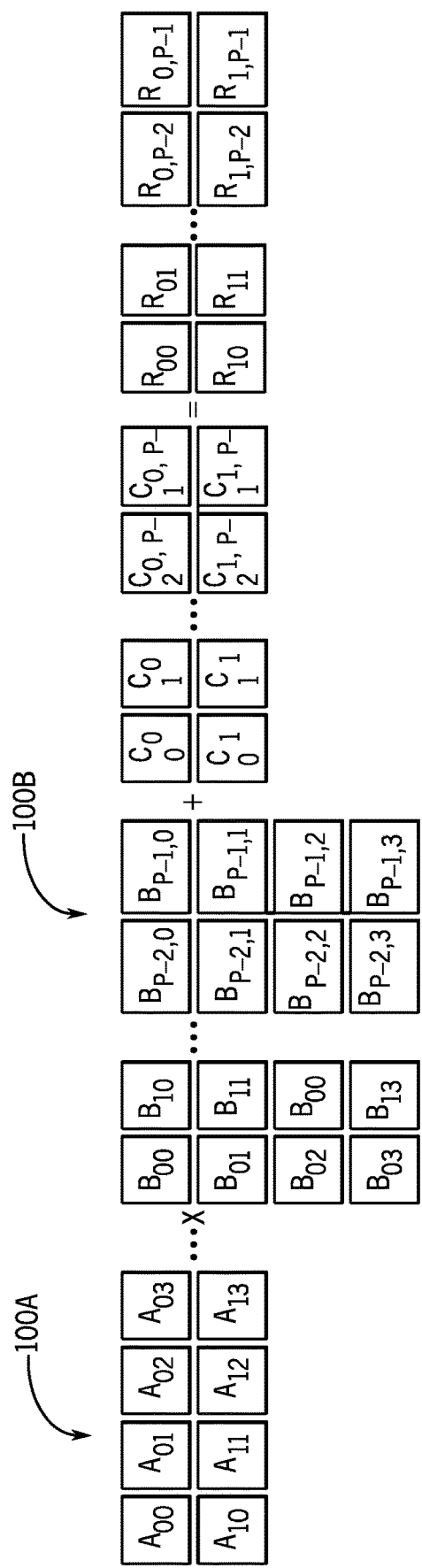
FIG. 25 is a block diagram of a dataflow for matrix blocking, in accordance with an embodiment.

Turning now to FIG. 25, an example of the dataflow for matrix blocking multiplication is illustrated. More specifically, FIG. 25 illustrates a dataflow suitable to multiply the first matrix 100A, which may include two rows and four columns or six columns (e.g., a 2×4 matrix or a 2×6 matrix), by the second matrix 100B, which may include four rows or six rows and a certain number (P) of columns (e.g., a 4×P matrix or a 6×P matrix), using a DSP circuitry, such as the DSP circuitry (e.g., 230, 240, 260, 270, 290) of the shadow register mode DSP architecture 220. More generally, the dataflow may be applied to multiply a matrix having two rows and a multiple (N) of four or six columns (e.g., a 2×4N or a 2×6N) matrix by a matrix having the same multiple (N) of four or six rows and a certain number (P) of columns (e.g., a 4N×P or a 6N×P matrix) by cascading N DSP circuitries (e.g., 230, 240, 260, 270, 290) through a carry-chain (e.g., cascade chain 140). For example, as illustrated, the products resulting from the multiplication of corresponding elements in the first matrix 100A and the second matrix 100B may be summed with a respective carry-in value (C) routed from the carry-chain (e.g., cascade chain 140) to produce a result (R).

Figure 26:
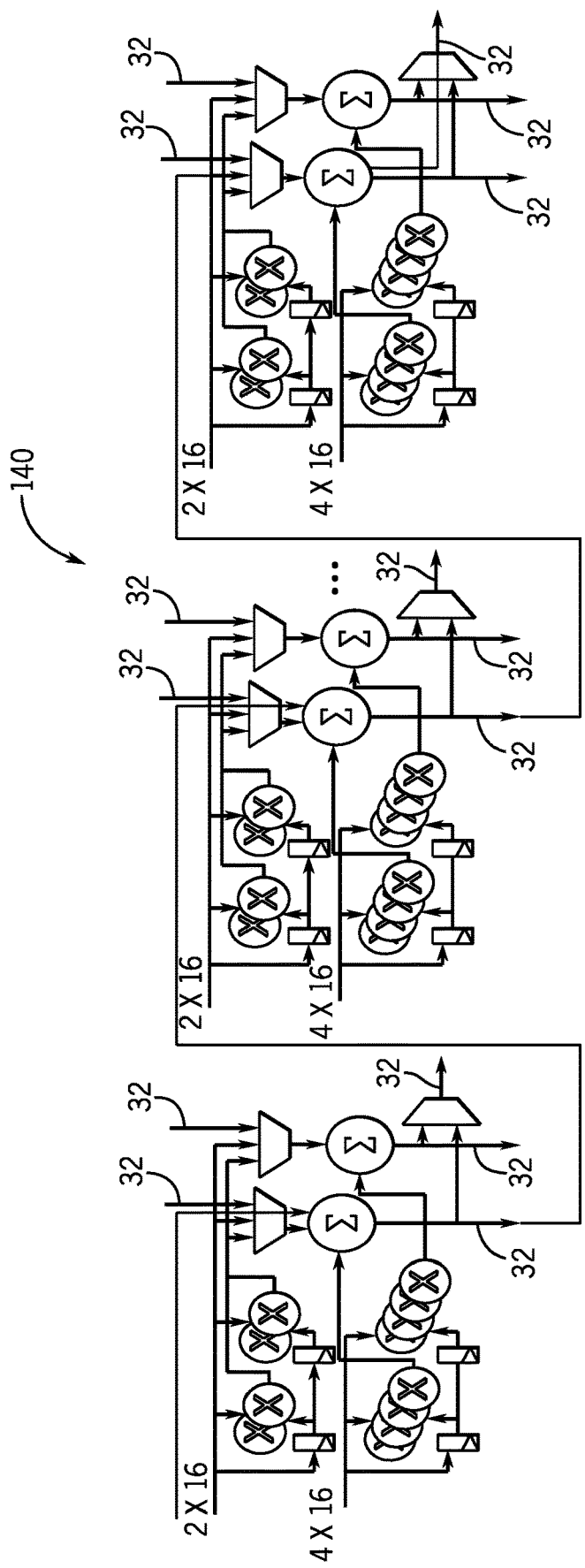
FIG. 26 is a block diagram of circuitry implemented to compute a 1×6N×P multiplication, in accordance with an embodiment.

FIG. 26 illustrates an embodiment of 1×6N×P multiplication. In cases where N=1, a single DSP circuitry, such as 230, 240, 260, 270, 290, may be implemented to compute the 1×6*1×P multiplication. On the other hand, in cases where N>1, a cascade of multiple DSP circuitries (e.g., 230, 240, 260, 270, 290) may be used to compute the 1×6N×P multiplication, as illustrated. In such embodiments, a first DSP circuitry may optionally bypass two multipliers 64 for an accumulator operand input, as illustrated by input path 310. Further, the middle DSP circuitries of the cascade chain 140 may be implemented to use the carry-chain for accumulation, as illustrated by path 312. Moreover, a last DSP circuitry of the cascade chain 140 may be implemented to provide a result of the 1×6N×P multiplication, as illustrated by output path 314.

Figure 27:
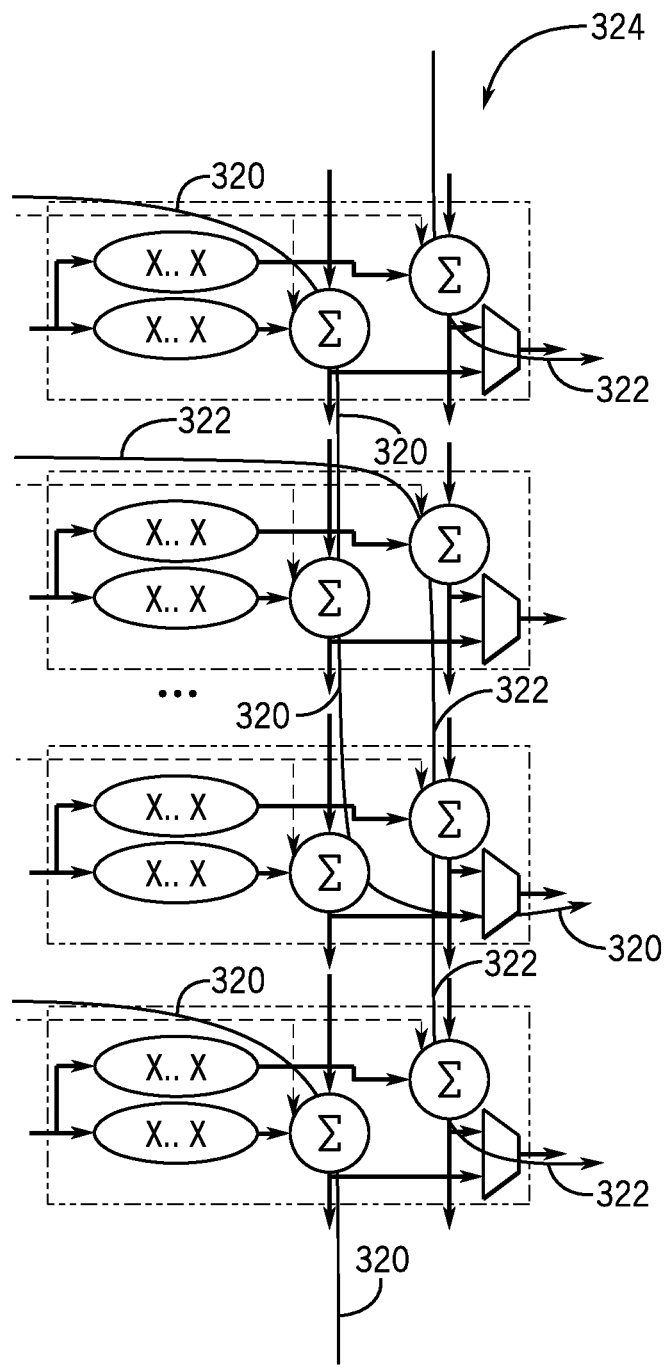
FIG. 27 is a block diagram of a circuitry implemented to compute a 2×6N×P multiplication, in accordance with an embodiment.

Turning now to FIG. 27, an embodiment of 2×6N×P multiplication is illustrated. In some embodiments, 2×6N×P multiplication may be performed by staggering the cascades of the circuitry implemented to compute 1×6N×P multiplication illustrated in FIG. 26. Accordingly, a first path 320 may indicate an accumulation chain for the first cascade, while a second path 322 may indicate an accumulation chain for the second cascade. In some embodiments, DSP circuitries (e.g., 230, 240, 260, 270, 290) where the accumulation chain (e.g., the first path 320 or the second path 322) enters may use a subset of the total multipliers 64 available (e.g., eight out of twelve and/or 64 bits of the 96 bits). Moreover, in some embodiments, using the multiplication structure 324 illustrated in FIG. 27, 12*P*N—* operations may be implemented in P+2 cycles using N DSP circuitries (e.g., 230, 240, 260, 270, 290).

Figure 28:
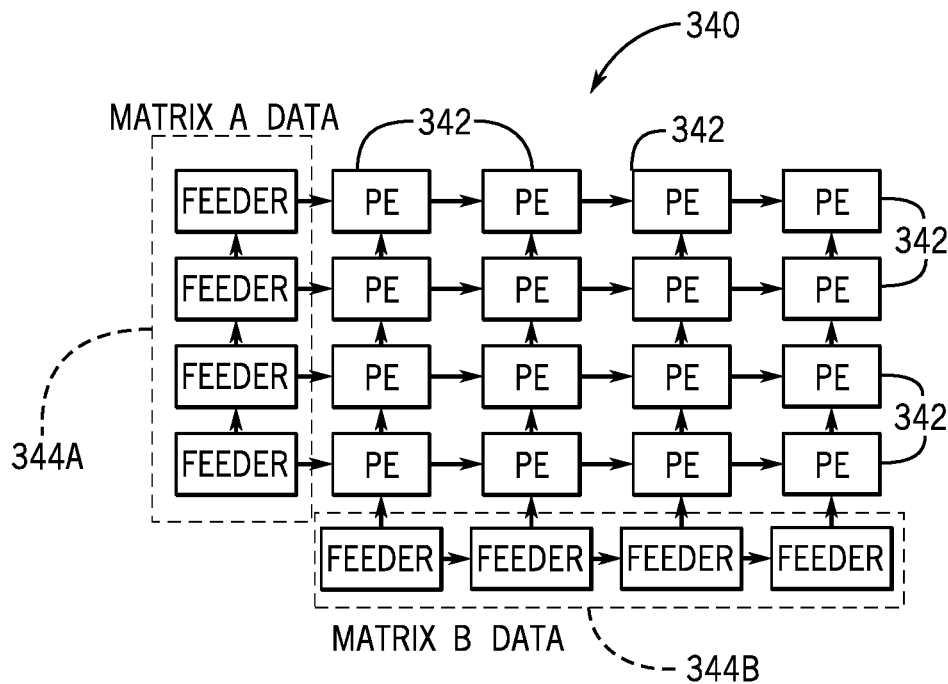
FIG. 28 is a block diagram of a processing element (PE) array, in accordance with an embodiment.

FIG. 28 illustrates a processing element (PE) array 340, which may be implemented to perform matrix multiplication (e.g., systolic array multiplication). As illustrated, the processing element array 340 (e.g., systolic array) includes a 2D array of a number of processing elements 342 (e.g., dot-product based processing elements). In some embodiments, as described in greater detail below, the processing elements 342 (e.g., processing circuitry) encapsulate one or more DSP circuitries (e.g., 60, 80, 170, 200, 230, 240, 260, 270, 290). Further, the processing element array 340 is communicatively coupled to a first set of feeders 344A, which may contain data corresponding to a first matrix (A) (e.g., the first matrix 100A), and to a second set of feeders 344B, which may contain data corresponding to a second matrix (B) (e.g., the second matrix 100B).

In some embodiments, each of the processing elements 342 may be implemented to compute multiplication operations corresponding to a region of a result matrix (R). More specifically, as graphically illustrated in FIG. 29, the highlighted region 350 of the result matrix (R) may be generated by a processing element 342 based on the multiplication of data corresponding to the first matrix (A), such as the data (e.g., elements) in the rows labeled M, and data corresponding to the second matrix (B), such as the data in the columns labeled P. In some embodiments, M may be greater than or equal to two (e.g., greater than or equal to two rows). More specifically, based in part on the DSP circuitries (e.g., 60, 80, 170, 200, 230, 240, 260, 270, 290) described herein, M may represent an even number greater than or equal to two. Further, in some embodiments, as the number represented by P increases, the frequency of loading of the rows of the first matrix (A) into registers 82 of a DSP circuitry decreases, which may increase efficiency of the processing element array 340.

In terms of the data sequence and/or dataflow involved with a processing element 342, the processing element 342 may load a first segment (e.g., a dot-size element) from two or more (e.g., M) consecutive rows in the first matrix (A). The processing element 342 may then present a corresponding first segment loaded from P consecutive columns in the second matrix (B) and may calculate a dot-product operation on the two segments. The processing element 342 may then load a second segment from a subsequent set of two or more (e.g., M) consecutive rows in the first matrix (A). Further, the processing element 342 may present the same first segment loaded from the P consecutive columns in the second matrix B. Once the processing element 342 has performed an operation using a respective segment retrieved from each of the rows in matrix A, the processing element 342 may load a segment from a subsequent row and/or column. For example, the processing element 342 may then load a third segment corresponding to two or more consecutive rows in the first matrix A and may present a new segment loaded from the subsequent set of P consecutive columns in the second matrix (B). Further, it may be appreciated that each processing element 342 may use this dataflow. Moreover, it may be appreciated that each processing element 342 in a row may operate using the same elements (e.g., segments) from the first matrix (A) and each processing element 342 in a column may operate using the same elements (e.g., segments) from the second matrix (B). That is, for example, a data bus may route from one processing element 342 to the next across the entire processing element array 340.

Figure 30:
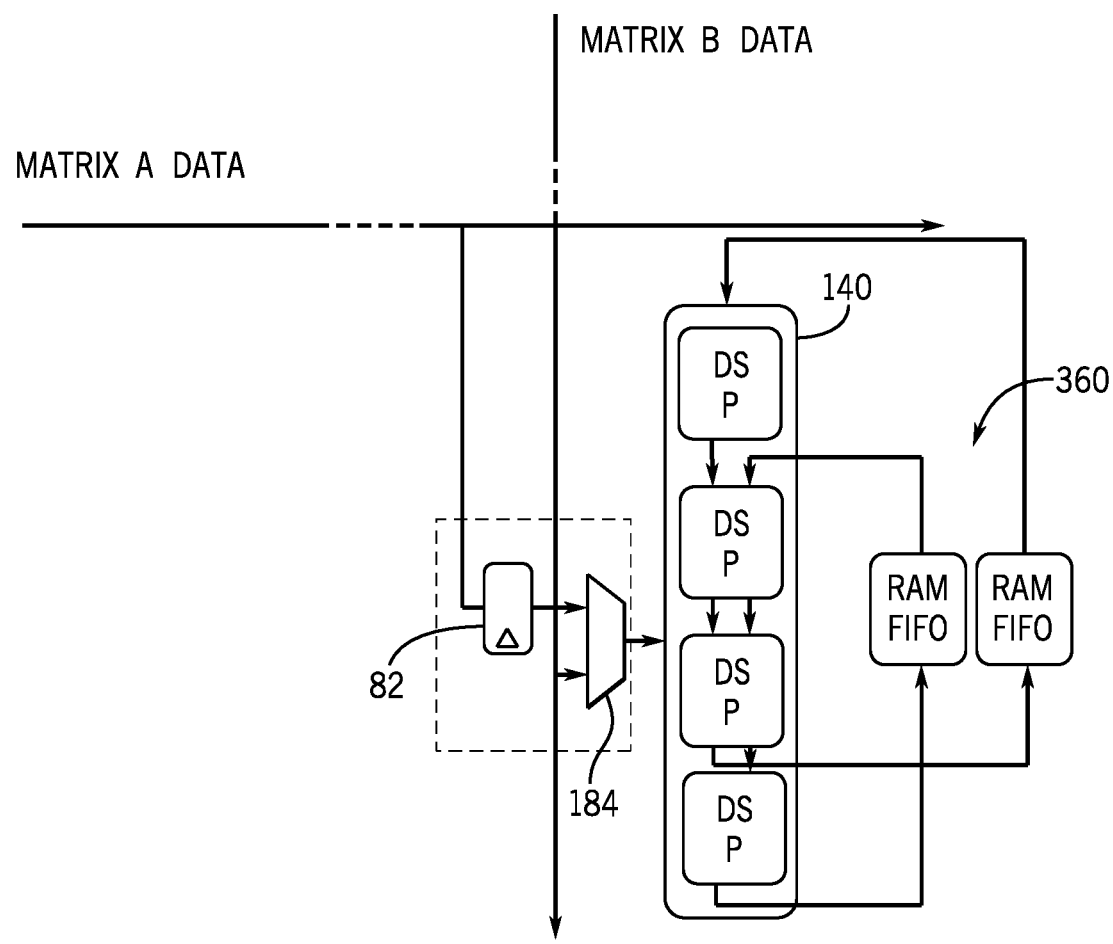
FIG. 30 is a block diagram of a processing element (PE), in accordance with an embodiment.

Turning now to FIG. 30, a processing element 342 may represent a building block for an arbitrarily sized matrix multiplication. Accordingly, the processing element 342 may be implemented to compute at least two dot-products and may include associated accumulators 360 (e.g., accumulation circuitry). Moreover, as illustrated, the processing element 342 may be constructed from a cascade chain 140 of DSP circuitries (e.g., 60, 80, 170, 200, 230, 240, 260, 270, 290). For example, in some embodiments, a 2×dot 128 operation may be implemented with a set of twenty-two cascaded DSP circuitries (e.g., 60, 80, 170, 200, 230, 240, 260, 270, 290). Alternatively, if sectors of the integrated circuit device 12 are crossed, twenty-three DSP circuitries (e.g., 60, 80, 170, 200, 230, 240, 260, 270, 290) may be used to compute the 2×dot 128 operation.

The illustrated accumulator 360, which may be implemented with a first-in, first-out (FIFO) structure, may support interleaving of P or more independent multiplication results. Moreover, the processing element 342 may include a register 82, such as an adaptive logic module register, which may store an operand (e.g., an input) from the first matrix (A). The operand may be received infrequently, and may be received across several clock cycles. Further, in some embodiments, selection circuitry 184 (e.g., a mux) may route the input to the cascade 140. More specifically, data originating outside the processing element 342 (e.g., at the feeders 344 (e.g., 344A and 344B) may be routed (e.g., serialized) into the cascade 140 at a suitable time to accommodate a suitable dataflow, as illustrated in FIGS. 5, 12, 13, 15, 22, and 25. In some embodiments, as described in greater detail below, the data corresponding to the first matrix (A) and the data corresponding to the second matrix (B) may arrive at the cascade 140 at different times to match an input schedule of the cascade chain 140.

Figure 31:
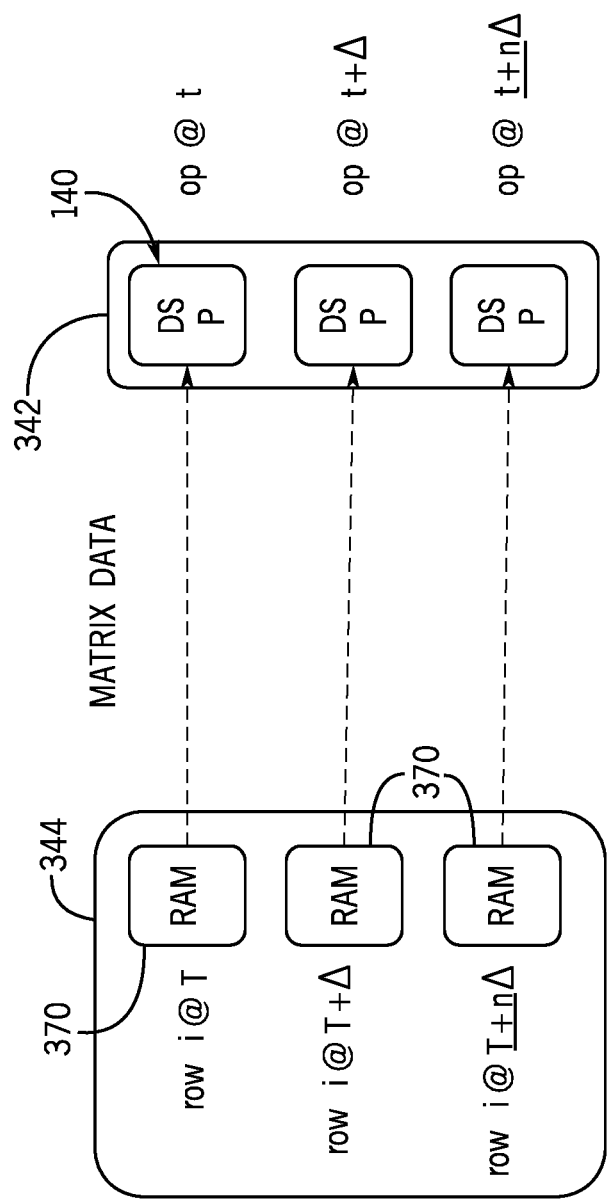
FIG. 31 is a block diagram of an input schedule of data delivered from a feeder to a processing element (PE), in accordance with an embodiment.

FIG. 31 illustrates an example of the timing of the input schedule of data delivered from a feeder 344 to the cascade 140. In some embodiments, each of the feeders 344 (e.g., 344A and 344B) may store matrix data corresponding to a matrix (e.g., the first matrix (A) and the second matrix (B), respectively). In some embodiments, the feeder 344 may include staggered indexing into the random-access memories (RAMs) 370, which may be embedded memory blocks 150, included in the feeder 344 to account for the propagation latency of the cascade 140 (Δ) (e.g., the latency between DSP circuitries in the cascade 140). Accordingly, as illustrated, the indexing of the RAMs 370 may be determined based on a clock (T) and an increment of the propagation latency of the cascade (nΔ), which may correspond to the position (e.g., index) of the DSP circuitry implemented to receive the data included in a respective RAM 370. That is, for example, as discussed above with reference to FIG. 8, the indexing to memory, such as embedded memory blocks 150, may be staggered to balance the delay of the cascade chain 140. Further, while a single processing element 342 is illustrated, a feeder 344 may present data to a row and/or column of processing elements 342. Moreover, each of the processing elements 342 in a row and/or column may receive the same staggered (e.g., delayed) data from the feeder 344.

In some embodiments, the number of processing elements 342 included in the processing element array 340 may be determined based in part on the size of the result matrix (R) produced as the output of the matrix multiplication operations performed by the processing element array 340. Further, in some embodiments, the number of processing elements 342 included in the processing element array 340 may be determined based in part on the wiring distance and/or density of wires involved with routing data to, from, and/or between processing elements 342. Additionally, the number of processing elements 342 included in the processing element array 340 may be determined based in part on the type and/or size of the DSP circuitries (e.g., 60, 80, 170, 200, 230, 240, 260, 270, 290) used to implement the processing elements 342. For example, an integrated circuit device 12 implemented with 4,608 DSP circuitries may be used to implement approximately 192 processing elements 342. In such cases, multiplication of the size 502×1024 may lead to a configuration of the processing element array 340 having 48×4 processing elements 342. Moreover, each of the processing elements 342 may be implemented to process (e.g., compute inner-products) for a tile of 12×256 elements, where M=12 and P=256, as graphically illustrated in FIG. 29.

Figure 32:
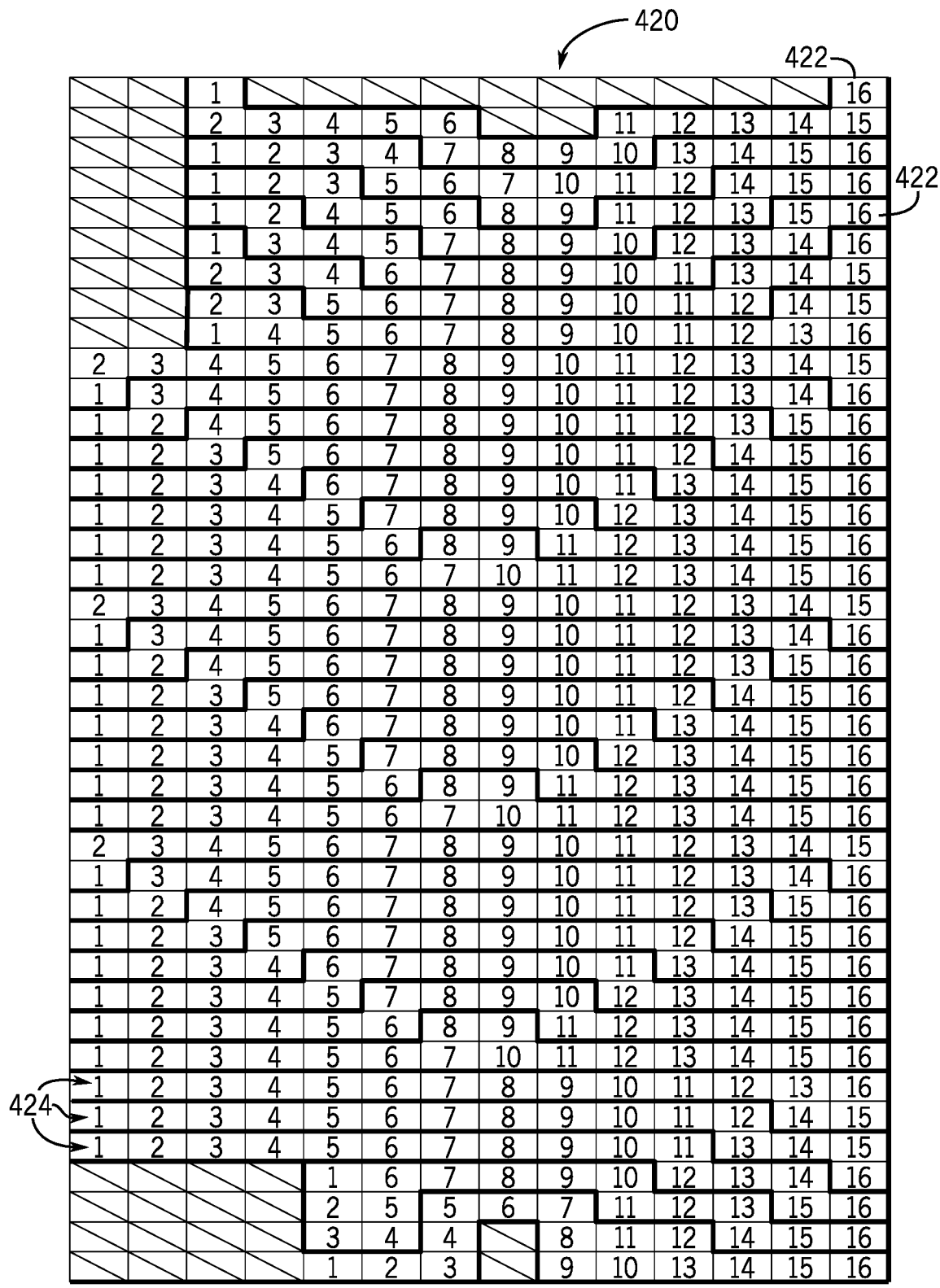
FIG. 32 is a block diagram of a physical array, in accordance with an embodiment.

Further, in some embodiments, the processing element array 340 geometry and/or configuration may not match the number of rows and/or columns of DSP circuitries (e.g., rows and/or columns available for processing elements 342) included on the integrated circuit device 12. For example, in some embodiments, the array of 48×4 processing elements 342 described above may be mapped to a physical array of 11×18 processing elements 342. That is, for example, the layout of the processing element array 340 may be associated flexibly with the available DSP circuitries and their locations in the integrated circuit device. With the foregoing in mind, FIG. 32 illustrates a logical array (e.g., the processing element array 340) mapped to a physical array 420. Each element 422 represents a DSP circuitry. Accordingly, the illustrated embodiment depicts a mapping of a logical array with sixteen columns onto a physical array 420 of the integrated circuit device 12 with fourteen columns. As illustrated, in some embodiments, the logical array may be redistributed (e.g., bent) to fit the sixteen columns within the fourteen columns of the physical array 420. Further, the illustrated mapping of the logical array onto the physical array uses the actual location of the DSP circuities included in the integrated circuit device 12 to place dot-products 424 proximate to their logical coordinates.

Figure 29:
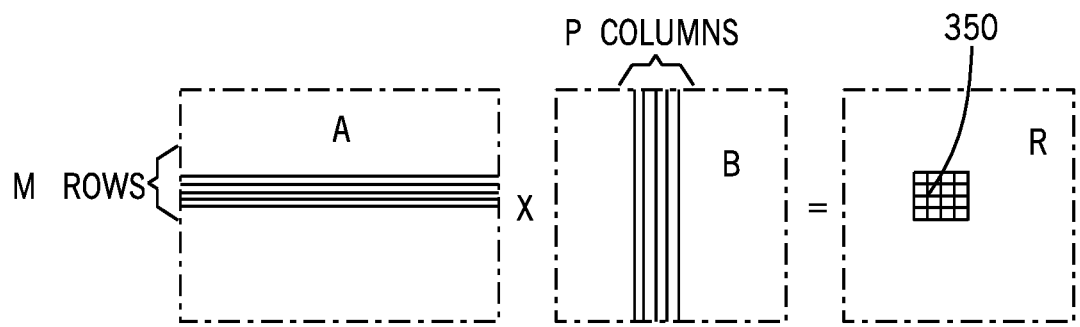
FIG. 29 is a block diagram graphically illustrating matrix multiplication performed by a processing element (PE), in accordance with an embodiment.

The technical effects of the present approach include handling of pairs (e.g., M) of rows, as graphically illustrated in FIG. 29. Moreover, in some embodiments, matrix inputs to the input circuitry 62 of the DSP circuitries may be serialized (e.g., multiplexed) to account for the DSP architectures described herein. Further, as described with reference to FIG. 31 the data received from the feeders 344 may be staggered to account for the input schedule of the cascade 140. Further, as described with reference to FIG. 32, the physical device geometry of the integrated circuit device 12 may be decoupled from the geometry of the processing element array 340, which may provide greater design flexibility.

Figure 33:
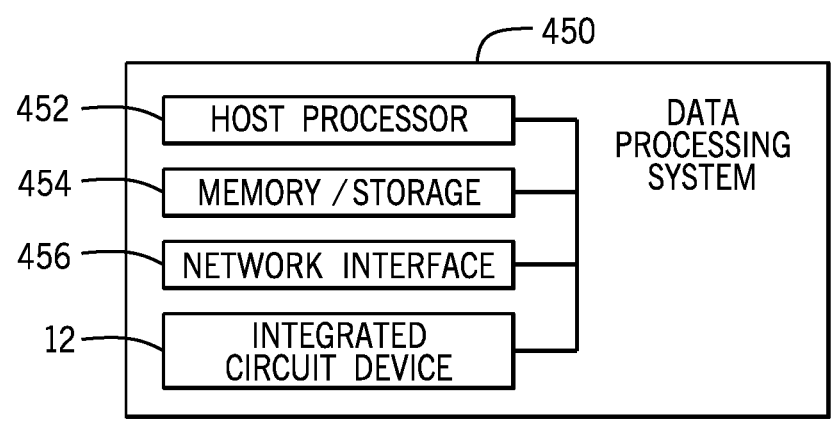
FIG. 33 is block diagram of a data processing system, in accordance with an embodiment.

Further, the integrated circuit device 12 may be, or may be a component of, a data processing system. For example, the integrated circuit device 12 may be a component of a data processing system 450, shown in FIG. 33. The data processing system 450 may include a host processor 452, memory and/or storage circuitry 454, and a network interface 456. The data processing system 450 may include more or fewer components (e.g., electronic display, user interface structures, application specific integrated circuits (ASICs)). The host processor 452 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 450 (e.g., to perform encryption, decryption, machine learning, video processing, voice recognition, image recognition, data compression, database search ranking, bioinformatics, network security pattern identification, spatial navigation, or the like). The memory and/or storage circuitry 454 may include random access memory (RAM), read-only memory (ROM), one or more hard drives, flash memory, or the like. The memory and/or storage circuitry 454 may hold data to be processed by the data processing system 450. In some cases, the memory and/or storage circuitry 454 may also store configuration programs (bitstreams) for programming the integrated circuit device 12. The network interface 456 may allow the data processing system 450 to communicate with other electronic devices. The data processing system 450 may include several different packages or may be contained within a single package on a single package substrate.

In one example, the data processing system 450 may be part of a data center that processes a variety of different requests. For instance, the data processing system 450 may receive a data processing request via the network interface 456 to perform encryption, decryption, machine learning, video processing, voice recognition, image recognition, data compression, database search ranking, bioinformatics, network security pattern identification, spatial navigation, or some other specialized task. The host processor 452 may cause the programmable logic fabric of the integrated circuit device 12 to be programmed with DSP circuitry, a physical array 420, and/or the like suitable to implement a requested task. For instance, the host processor 452 may instruct that a configuration data (bitstream) stored on the memory and/or storage circuitry 454 to be programmed into the programmable logic fabric of the integrated circuit device 12. The configuration data (bitstream) may represent a circuit design for dot-product circuitry 26, which may be mapped to the programmable logic according to the techniques described herein. For example, the dot-product circuitry may be implemented to include any suitable combination of DSP circuitries (e.g., 60, 80, 170, 200, 230, 240, 260, 270, 290) and/or architectures described herein. As such, the integrated circuit device 12 may assist the data processing system 450 in performing the requested task, such as operations associated with AI, ML, DL, and/or the like.

While the embodiments set forth in the present disclosure may be susceptible to various modifications and alternative forms, specific embodiments have been shown by way of example in the drawings and have been described in detail herein. For example, any suitable combination of the embodiments and/or techniques described herein may be implemented. Moreover, any suitable combination of number formats (e.g., single-precision floating-point, half-precision floating-point, bfloat16, extended precision and/or the like) may be used. Further, each DSP circuitry and/or DSP architecture may include any suitable number of elements (e.g., adders, multipliers 64, routing, and/or the like). Accordingly, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. Circuitry implemented on an integrated circuit device, comprising:
input circuitry comprising:
a first input configured to receive a first vector of a first matrix and a second vector of a second matrix; and
a second input configured to receive the second vector and a third vector of the first matrix;
a first register communicatively coupled to the first input and a second register communicatively coupled to the second input, wherein the first register and second register are each configurable to store at least a portion of the second vector;
multiplier circuitry comprising:
a first multiplier configurable to:
receive the first vector directly from the first input and receive the second vector from the first register; and
determine a first partial inner-product based at least in part on the first vector and the second vector; and
a second multiplier configurable to:
receive the third vector from the second input and the second vector from the second register; and
determine a second partial inner-product based at least in part on the second vector and the second vector; and
adder circuitry configured to:
determine a first inner-product of a dot-product based at least in part on the first partial inner-product; and
determine a second inner-product of the dot-product based at least in part on the second partial inner-product.

2. The circuitry of claim 1, wherein the first vector comprises a row vector and the second vector comprises a column vector.

3. The circuitry of claim 1, wherein the first vector comprises a column vector and the second vector comprises a row vector.

4. The circuitry of claim 1, wherein the second matrix is a vector.

5. The circuitry of claim 1, comprising a crossbar disposed between, and communicatively coupled to, the second register and the multiplier circuitry, wherein the crossbar is configured to selectively output first data associated with the first vector, second data associated with the second vector, or both to the multiplier circuitry.

6. The circuitry of claim 1, comprising selection circuitry communicatively coupled to the input circuitry and the first register, wherein the circuitry is configured to selectively perform a first operation or a second operation based at least in part on an output of the selection circuitry.

7. The circuitry of claim 1, wherein the adder circuitry comprises a fused adder.

8. The circuitry of claim 1, wherein:
the input circuitry is communicatively coupled to output circuitry of additional circuitry configured to output, at the output circuitry, a third partial inner-product based at least in part on the first vector and the second vector; and
the adder circuitry is configured to determine the first inner-product based at least in part on the first partial inner-product and the third partial inner-product.

9. The circuitry of claim 1, wherein the integrated circuit device comprises a processing array comprising a plurality of digital signal processing (DSP) blocks, wherein one of the plurality of DSP blocks comprises the circuitry.

10. The circuitry of claim 1, wherein the integrated circuit device comprises a field-programmable gate array (FPGA).

11. Processing circuitry, comprising:
a cascade chain configured to determine a dot-product based at least in part on first data associated with a first matrix and second data associated with a second matrix, wherein the first data comprises a first vector and a second vector of the first matrix, wherein the second data comprises a third vector of the second matrix, wherein the cascade chain comprises a plurality of digital signal processing (DSP) blocks, wherein a first DSP block of the plurality of DSP blocks comprises:
  input circuitry comprising:
    a first input configured to receive the first vector and the third vector; and
    a second input configured to receive the second vector and the third vector;
  a first register communicatively coupled to the first input and a second register communicatively coupled to the second input, wherein the first register and second register are each configurable to store at least a portion of the second vector;
  multiplier circuitry comprising:
    a first multiplier configurable to:
      receive the first vector directly from the first input and receive the third vector from the first register; and
      determine a first partial inner-product based at least in part on the first vector and the third vector; and
    a second multiplier configurable to:
      receive the third vector from the second input and the second vector from the second register; and
      determine a second partial inner-product based at least in part on the second vector and the third vector; and
  adder circuitry configured to:
    determine a first inner-product of the dot-product based at least in part on the first partial inner-product; and
    determine a second inner-product of the dot-product based at least in part on the second partial inner-product; and an embedded memory communicatively coupled to an output of the cascade chain and configured to:
  receive the dot-product from the cascade chain; and
  store the dot-product.

12. The processing circuitry of claim 11, comprising selection circuitry communicatively coupled to an input of the cascade chain, wherein the selection circuitry is configured to serialize the first data, the second data, or a combination thereof into the cascade chain.

13. The processing circuitry of claim 11, wherein the embedded memory is configured to implement a first-in, first-out (FIFO) structure.

14. The processing circuitry of claim 11, wherein the second data comprises the third vector and a fourth vector of the second matrix.

15. The processing circuitry of claim 14, wherein the cascade chain is configured to:
determine the dot-product based at least in part on the first vector and the third vector;
output the dot-product at first output circuitry;
determine an additional dot-product based at least in part on the first vector and the fourth vector; and
output the additional dot-product at second output circuitry.

16. The processing circuitry of claim 11, wherein the plurality of DSP blocks comprises four DSP blockss.

17. The processing circuitry of claim 11, wherein the first DSP block comprises a crossbar disposed between, and communicatively coupled to, the second register and the second multiplier, wherein the crossbar is configured to selectively output first data associated with the second vector or second data associated with the third vector to the second multiplier.

18. The processing circuitry of claim 11, wherein the adder circuitry comprises floating-point compressor circuitry.

19. A hardware-implemented method, comprising:
receiving, at a first input of a digital signal processing (DSP) block at a first time, a first vector;
receiving, at a second input of the DSP block, of the first vector;
storing, in both a first register of the DSP block communicatively coupled to the first input and a second register of the DSP block communicatively coupled to the second input, at least a portion of the first vector;
receiving, at the first input at a second time later than the first time, a second vector;
receiving, at the second input, a third vector;
receiving, at a first multiplier of the DSP block that is communicatively coupled directly to the first input, the second vector from the first input and the first vector from the first register;
receiving, at a second multiplier of the DSP block that is communicatively coupled to the second input and the second register, the third vector from the second input and the first vector from the second register;
determining, using the first multiplier, a first partial inner-product based at least in part on the first vector and the second vector; and
determining, using the second multiplier, a second partial inner-product based at least in part on the first vector and the third vector.

20. The hardware-implemented method of claim 19, further comprising:
determining, using adder circuitry of the DSP block, a first inner-product based at least in part on the first partial inner-product; and determining, using the adder circuitry, a second inner-product based at least in part on the second partial inner-product.

\* \* \* \* \*